United States Patent
Sheikholeslami et al.

(10) Patent No.: US 11,645,896 B2
(45) Date of Patent: May 9, 2023

(54) SYSTEMS, DEVICES, AND METHODS FOR PROVIDING ACTUATOR BRAKING

(71) Applicant: Immersion Corporation, San Jose, CA (US)

(72) Inventors: Majid Sheikholeslami, Burlington (CA); Peyman Karimi Eskandary, Montreal (CA); Vahid Khoshkava, Montreal (CA); Jamal Saboune, Montreal (CA)

(73) Assignee: IMMERSION CORPORATION, Aventura, FL (US)

( * ) Notice: Subject to any disclaimer, the term of this patent is extended or adjusted under 35 U.S.C. 154(b) by 415 days.

(21) Appl. No.: 16/881,659

(22) Filed: May 22, 2020

(65) Prior Publication Data

US 2021/0364054 A1    Nov. 25, 2021

(51) Int. Cl.
*G08B 6/00* (2006.01)
*H02K 49/00* (2006.01)

(52) U.S. Cl.
CPC .............. *G08B 6/00* (2013.01); *H02K 49/00* (2013.01); *F16D 2500/3023* (2013.01); *F16D 2500/70652* (2013.01)

(58) Field of Classification Search
CPC ........ G06F 3/016; G06F 3/041; G06F 3/0213; G08B 6/00; H02K 49/00; F16D 2500/3023; F16D 2500/70652
See application file for complete search history.

(56) References Cited

U.S. PATENT DOCUMENTS

| | | |
|---|---|---|
| 9,520,036 B1 | 12/2016 | Buuck et al. |
| 2011/0163985 A1 | 7/2011 | Bae et al. |
| 2016/0155305 A1* | 6/2016 | Barsilai ................ G08B 6/00 340/407.1 |
| 2017/0052593 A1 | 2/2017 | Jiang et al. |
| 2018/0033262 A1 | 2/2018 | Shah et al. |
| 2018/0075715 A1 | 3/2018 | Morrell et al. |
| 2018/0229116 A1* | 8/2018 | Rihn ................... G06F 3/016 |

OTHER PUBLICATIONS

International Search Report dated Sep. 9, 2021 in PCT/US2021/033347.

* cited by examiner

*Primary Examiner* — Robert J Michaud
(74) *Attorney, Agent, or Firm* — Medler Ferro Woodhouse & Mills PLLC

(57) ABSTRACT

Systems, methods, and devices for control of actuators are provided. In aspects, the systems, methods, and devices provided herein enable the generation of sharp cutoff haptic effects of both limited and extended duration. The systems, methods, and devices use open loop braking signals to generate the sharp cutoff haptic effects. The braking signals are determined based on predictions of system response made according to driving signals used to cause the haptic effects in the actuators. Numerous other aspects are provided.

20 Claims, 9 Drawing Sheets

SYSTEMS, DEVICES, AND METHODS FOR PROVIDING ACTUATOR BRAKING

FIELD OF THE INVENTION

The present methods and apparatus relates to systems, devices, and methods for providing one or more haptic effects. In particular, one embodiment of the present methods and apparatus is directed to providing techniques for open loop braking of and actuator to produce, for example, a well-defined haptic effect of limited or extended duration.

BACKGROUND OF THE INVENTION

Haptic actuators for producing vibration effects, e.g., vibration actuators such as eccentric rotating masses, linear resonant actuators, piezo based actuators, etc., are conventionally used in haptically enabled devices to provide vibration effects of moderate to long durations. Such haptic effects present to a user as buzzing or vibrating sensations. Providing a buzzing sensation can be implemented through excitation of a vibration actuator for many, e.g., dozens, hundreds, or even thousands of oscillations. Such vibration effects are implemented through conventional open loop control techniques of the vibration actuators. Precise actuator control over limited durations in these circumstances is not required and would introduce unnecessary costs in device manufacture.

In some circumstances, precise actuator control may be desirable, for example, to produce haptic effects having a sharp cutoff, wherein a haptic effect produced by the actuator ends abruptly. The present methods and apparatus provide improved actuator control, for example, including generating limited and/or extended duration haptic effects having sharp cutoffs in haptically enabled devices.

BRIEF SUMMARY OF THE INVENTION

Systems, devices, and methods are provided herein to generate limited and extended duration haptic effects with sharp cutoffs using active braking. Active, open-loop, braking is applied to actuators to arrest the motion of the actuator and cause a sharp ending to applied haptic effects. The timing and duration of the braking signals are selected according to an analysis of the driving signal. Analysis of the driving signal provides information about an amount of energy input into an actuator system and about the dynamics of an actuator system. This information is then employed in developing braking signals to brake the actuator system.

In an embodiment, a haptically enabled device comprises an actuator and a control circuit. The control circuit is configured to control the actuator to produce a haptic effect by providing a driving signal to the actuator, providing a first braking signal having a first polarity to the actuator during a first braking window determined according to the driving signal, and providing a second braking signal to the actuator during a second braking window determined according to the driving signal, wherein a second polarity of the second braking signal is opposite of the first polarity.

In an embodiment, a method of controlling an actuator to produce a haptic effect is provided. The method includes providing a driving signal associated with an amplitude, a frequency, a number of peaks and/or a number of oscillation half-cycles to the actuator; providing to the actuator a first braking signal having a first braking signal duration based on the frequency associated with the driving signal; providing to the actuator a second braking signal having at least one of a second braking signal duration based on the frequency associated with the driving signal and an onset time based on the frequency and the number of peaks or the number of oscillation half-cycles associated with the driving signal.

BRIEF DESCRIPTION OF DRAWINGS

The foregoing and other features and advantages of the methods and apparatus will be apparent from the following description of embodiments hereof as illustrated in the accompanying drawings. The accompanying drawings, which are incorporated herein and form a part of the specification, further serve to explain the principles of the methods and apparatus and to enable a person skilled in the pertinent art to make and use the invention. The drawings are not to scale.

DETAILED DESCRIPTION OF THE INVENTION

Figure 1:
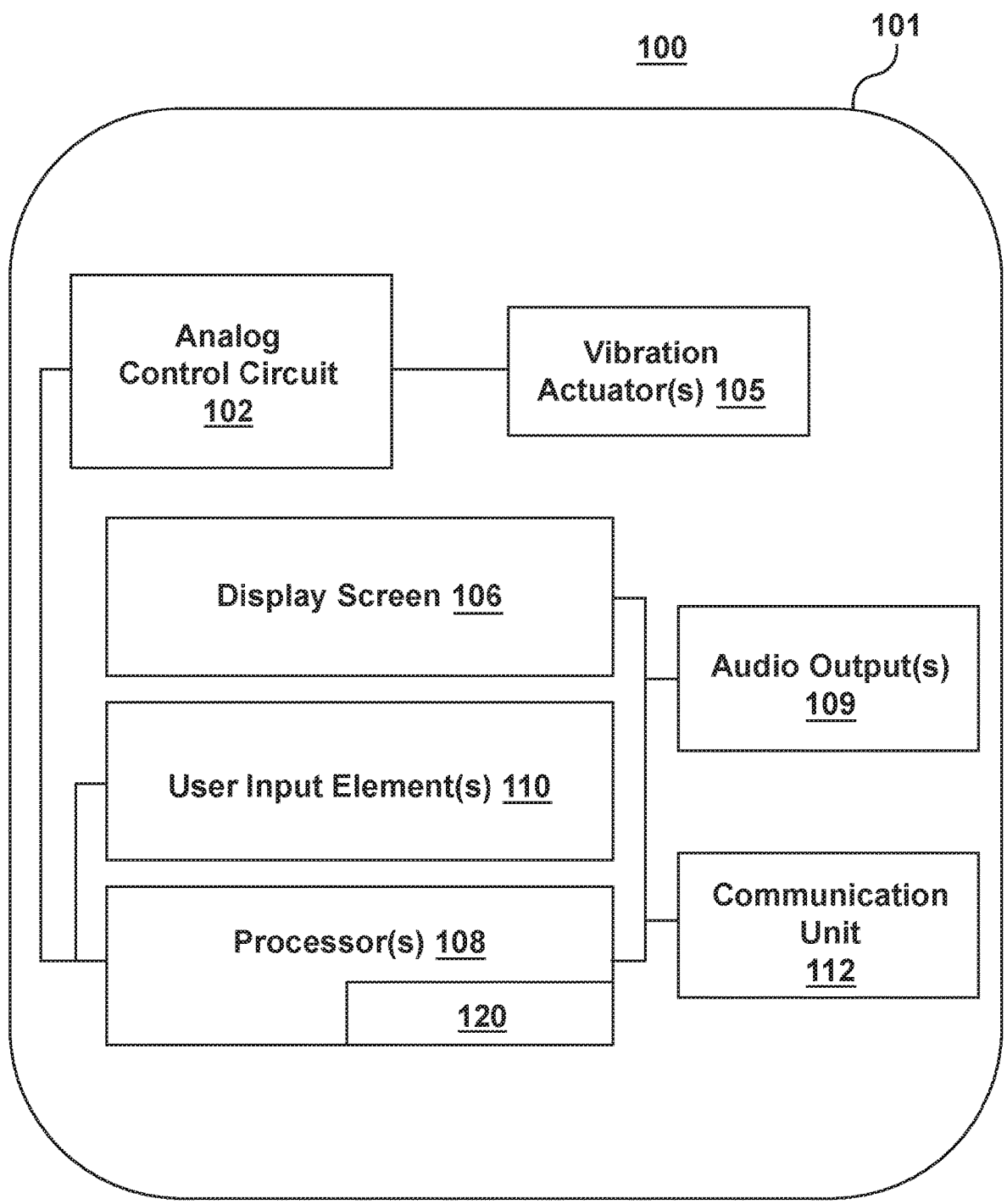
FIG. 1 is a schematic diagram illustrating aspects of a haptically enabled device in accordance with embodiments hereof.

Specific embodiments of the present methods and apparatus are now described with reference to the figures. The following detailed description is merely exemplary in nature and is not intended to limit the methods and apparatus or the application and uses of the methods and apparatus. Furthermore, there is no intention to be bound by any expressed or implied theory presented in the preceding technical field, background, brief summary or the following detailed description.

Embodiments described herein relate to haptically enabled devices. Haptically enabled devices consistent with embodiments herein may be configured as smartphones, tablet computing devices, smart watches, fitness bands, haptic enabled wearable devices, glasses, immersive reality (e.g., virtual reality (VR), augmented reality (AR), and/or mixed reality (MR)) headsets, handheld gaming devices, personal computers (e.g., a desktop computer, a laptop computer, etc.), televisions, interactive signs, and/or other devices that can be programmed to provide a haptic output to a user. Haptically enabled devices consistent with embodiments hereof include devices having one or more actuators for delivering haptic effects to the haptically enabled devices. In embodiments hereof, haptically enabled devices may also include user input elements, e.g., control elements such as triggers, buttons, joysticks, joypads, touchscreens, touchpads, etc., to permit a user to interact with a computer system. Haptically enabled devices may further include peripheral devices configured to augment the capabilities of other devices, haptically enabled or not.

Haptically enabled devices consistent with embodiments hereof may include processing systems. Processing systems consistent with embodiments described herein include one or more processors (e.g., also interchangeably referred to herein as processors, processor(s), or processor for convenience) or any other control circuit, one or more memory units, audio outputs, user input elements, a communication unit or units, and/or other components. Processors may be programmed by one or more computer program instructions to carry out methods described herein. Communication units consistent with the present methods and apparatus may include any connection device, wired or wireless, that may transmit or communicate with peripheral devices.

In embodiments hereof, haptically enabled devices may be provided separately from processing systems configured to provide haptic control signals to the haptically enabled device. Such haptically enabled devices include actuators and the required control circuits and power sources to activate the actuators. Haptically enabled devices provided separately from processing systems may be, for example, wearable devices intended for communication with a central processing system. Haptically enable devices according to these embodiments may include wrist-bands, rings, leg-bands, finger attachments, gloves, eye-glasses, and other types of devices configured to provide haptic outputs.

Embodiments hereof relate to control (e.g., open loop control) of actuators to produce haptic effects of limited or extended duration having sharp cut-offs through the application of braking signals applied during one or more braking windows. Braking signals are applied based on system analysis performed based on or according to a driving signal. As discussed in greater detail below, analysis of the driving signal permits an estimation of an amount of energy that is input into an actuator system (e.g., also referred to as actuator system energy) by the driving signal. In aspects, the amount of energy that is input into the actuator system is used to determine a duration of braking required. Analysis of the driving signal further permits a prediction of actuator system motion. The prediction of actuator system motion is used to determine onset timing or start timing of braking signals. The techniques and methods discussed below may be performed without explicitly estimating the actuator system energy or the actuator system motion. The characteristics of the braking signals described herein may be determined based solely on the characteristics of actuator driving signals, without the need for explicit computation of actuator system energy or motion.

The periodic, oscillatory nature of some actuator systems makes the use of open loop control difficult. When braking an oscillatory actuator system, the braking signals must also be applied periodically with alternating polarity so as to prevent inadvertently adding additional energy to the system. Some solutions, such as closed-loop solutions, may require additional hardware while other solutions may require accurate characterization of actuators. The open loop nature of embodiments presented herein provide cost and/or simplicity advantages over closed loop solutions and systems involving explicit actuator characterization. Further, in aspects, the solutions described herein may be employed to provide braking signals through existing system hardware. Accordingly, embodiments described herein may be deployed to provide accurate braking, and thus sharp cut-off effects, in existing systems without a requirement for hardware upgrades.

In embodiments, actuators and actuator systems suitable for use with systems and methods described herein may be any type of vibration, resonant, or inertial actuators or actuator systems. As used herein "vibration actuator" or "vibration actuator system" refers to an actuator or actuator system configured to produce a haptic effect by oscillation or vibration in response to a control signal. As used herein, "resonant actuator" or "resonant actuator system" refers to an actuator or actuator system having a resonant frequency. As used herein, "inertial actuator" or "inertial actuator system" refers to an actuator or actuator system that includes an inertial mass. For example, linear resonant actuators and voice coil actuators may be considered vibration actuators, resonant actuators, and inertial actuators. In further embodiments, the systems and methods described herein may be suitable for use with any actuator system that includes vibration, resonant, and/or inertial properties. For example, a macrofiber composite (MFC) actuator or a piezoelectric actuator coupled to a substrate has such properties. Although various descriptions herein may refer to specific actuators or actuator types, it will be understood that the methods, systems, and devices described herein may be applied to any type of actuator or actuator system having vibration, resonance, or inertial characteristics.

Actuators consistent with embodiments hereof may be capable of producing haptic effects, for example, by oscillating or vibrating at 10 Hz or more. In embodiments, actuators consistent with embodiments hereof may include macrofiber composite actuators, capable of producing effects at frequencies, for example, between 10 Hz and 10,000 Hz. In further embodiments, actuators consistent with embodiments hereof may include piezoelectric material based actuators, such as piezoceramic actuators, capable of producing effects at frequencies, for example, between approximately 10 Hz and 10,000 Hz. In further embodiments, actuators consistent with embodiments hereof may include linear resonant actuators (LRAs), solenoids, and voice coil actuators, capable of producing vibration effects at frequencies, for example, between approximately 50 Hz and 500 Hz. Further, smart material actuators, such as piezo-ceramic actuators, electroactive polymers, and others are consistent with embodiments hereof Other types of actuators configured to deliver haptic effects in the frequency range of, for example, 10 Hz and 10,000 Hz may be employed with embodiments hereof.

As stated above, embodiments hereof can relate to producing haptic effects of limited duration. Haptic effects of limited duration refer to haptic effects having a duration of less than 100 ms, for example. The length of a limited duration haptic effect may change according to the frequency of an actuator. For example, one oscillation of an actuator at 10 Hz requires 100 ms, and a limited duration haptic effect may be 100 ms or less. In contrast, at 1,000 Hz, one oscillation requires just 1 ms, and a limited duration haptic effect may encompass 15 oscillations, taking approximately 15 ms. In embodiments, limited duration haptic effects may have durations less than 100 ms, less than 50 ms, less than 30 ms, less than 25 ms, less than 20 ms, and/or less than 15 ms. In embodiments, limited duration haptic effects may employ vibration actuators operating between 10 Hz and 10,000 Hz for durations between 1 ms and 100 ms. Selection of limited duration haptic effect durations may be performed based on the type of actuator being used, the amount of force or displacement provided by the vibration actuator, and/or by the type of effect that is sought by the designer. In embodiments, the duration of the limited duration haptic effect may be determined according to a representative transient time of the vibration actuator producing the haptic effect. Limited duration haptic effects may be produced by a vibration actuator performing anywhere between 1 and approximately 15 oscillations, where the number of oscillations delivered may be selected according to the frequency of the vibration actuator.

Embodiments described herein are also consistent with extended duration haptic effects. Extended duration haptic effects include any haptic effects longer than limited duration haptic effects, as described above. Extended duration haptic effects may be any length, and may be longer than 100 ms, longer than 1 second, longer than 10 seconds, etc. Extended duration haptic effects may include any number of oscillations, including more than 15 oscillations, more than 50 oscillations, more than 100 oscillations, more than 1,000 oscillations, etc.

Some vibration actuators consistent with embodiments hereof, such as LRAs, are designed to provide a resonant response to a frequency input, and frequently have a high Q-factor or narrow bandwidth. Such actuators are constructed to reduce and/or minimize damping to provide greater efficiency. Thus, when provided with a command signal (e.g., periodic drive signal) at the resonant frequency of the vibration actuator, the vibration haptic response is increased and/or maximized. To prevent wasted energy, such actuators are constructed to reduce and/or minimize friction and other sources of damping. When a control signal to the vibration actuator is ceased, the vibration actuator will still oscillate several times at its resonant frequency. Creating a strong haptic effect requires a commensurately powerful signal which, without damping, will cause the vibration actuator to oscillate several times before slowing to a stop. For conventional uses of vibration actuators, this may be an acceptable result. By contrast, limited duration haptic effects may require a sharper effect cutoff, because tens of milliseconds of free oscillations will significantly distort, e.g., an intended 15 millisecond haptic effect. Further, the feel of extended duration haptic effects (e.g., of longer duration than limited duration effects) may be enhanced through the use of sharp cut-offs.

Embodiments hereof relate to control of actuators to produce sharp cutoff haptic effects of limited duration or extended duration. As used herein, "sharp haptic effects" or "sharp cutoff haptic effects" refers to haptic effects having an abrupt cut-off at the completion of the effect. A sharp haptic effect or sharp cutoff haptic effect may be characterized by having a cut-off period of less than 50 ms, less than 20 ms, less than 10 ms, less than 5 ms, and/or less than 1 ms, for example. A sharp haptic effect may also be defined by a reduction of peak acceleration, e.g., a 90%, 80%, 70%, or 60% reduction of acceleration within the cut-off period. A sharp haptic effect or sharp cutoff haptic effect may also be characterized as having a cut-off period of less than 3 periods of an effect frequency cycle, less than 2 periods of an effect frequency cycle, less than 1.5 periods of an effect frequency cycle, less than 1 period of an effect frequency cycle, and/or less than 0.5 period of an effect frequency cycle.

A cut-off period or braking period of a haptic effect refers to the time required to reduce an effect level of a haptic effect from an effective magnitude to a haptically imperceptible magnitude. "Effective magnitude" refers to a haptic effect magnitude suitable for delivering an intended haptic effect. For example, an effective magnitude may include effects ranging from 0.5 g-10 g of acceleration. In some applications, effective magnitudes may exceed 10 g. A "haptically imperceptible magnitude" refers to a haptic effect magnitude below a haptic perceptibility threshold. A haptic perceptibility threshold is a lowest haptic effect magnitude that can be perceived. Haptic perceptibility thresholds for different actuators and systems may vary according to an intended use of the actuator or system. For example, different body parts, e.g., fingertips vs wrists, may have different haptic perceptibility thresholds. Further, the use of an actuator or system may cause the perceptibility threshold to vary. For example, a wearable wrist band including an actuator, a haptic device configured for carrying in a user's pocket, and a touchscreen each may have different haptic perceptibility thresholds.

Haptic perceptibility thresholds, as discussed herein, may be based on an acceleration level of an actuator or actuator system. Acceleration levels are a common method of measuring the effect level of haptic effects. Haptic perceptibility thresholds, as discussed herein, may also refer to an amount of actuator or actuator system energy required to produce a perceptible haptic effect. Haptic perceptibility thresholds may include 0.5 g's, 0.4 g's, 0.3 g's, 0.2 g's, and 0.1 g's of acceleration. Below a haptic perceptibility threshold, most users can no longer feel a haptic effect. Accordingly, cut-off periods for sharp haptic effects may be measured from the end of the haptic effect to the point at which the magnitude of vibrations has been reduced below a haptic perceptibility threshold. In embodiments, after such reduction has been achieved, an actuator or actuator system may be permitted to dissipate any remaining energy naturally, as a user may no longer be able to feel the remaining motions of the system. Natural energy dissipation includes permitting the energy of the system to dissipate without any further active signals, driving, or braking. The end of a haptic effect may be measured according to the beginning of a braking signal, by the end of a driving signal, and/or by the completion of an intended effect.

In embodiments, a haptic perceptibility threshold may be estimated or predicted. Such a threshold may be chosen such that the threshold represents the perceptibility threshold for an estimated majority of users and may not take into account overly or underly sensitive users. Thus, haptic perceptibility thresholds, as used herein, may be represented by selected acceleration values, rather than explicit measurements of individual reactions to haptic effects. Thus, for example, an extra sensitive user may still be able to feel an effect that has been reduced lower than a haptic perceptibility threshold, and a less sensitive user may stop feeling an effect before it is reduced below a haptic perceptibility threshold.

FIG. 1 is a schematic diagram illustrating aspects of a haptically enabled device 100 in accordance with embodiments hereof. The haptically enabled device 100 includes one or more actuators 105, a control circuit 102, and a housing 101. In some cases, the haptically enabled device 100 further includes a display 106, at least one processor 108, at least one memory unit 120, one or more user input elements 110, one or more audio outputs 109, and one or more communication units 112.

The one or more actuators 105 include actuators configured for oscillation or vibration in response to a control signal. The actuators 105 are configured to produce haptic effects when a control signal in excess of 10 Hz, for example, is applied. The actuators 105 may include actuators configured with a spring-mass oscillatory system, such as linear resonant actuators (LRAs) and voice coil actuators. Linear resonant actuators consistent with embodiments hereof may include x-axis LRAs (xLRAs) and z-axis LRAs (zLRAs). The actuators 105 may further include piezoelectric actuators and macrofiber composite actuators. Actuators 105 consistent with embodiments hereof are configured to produce oscillatory effects ranging between approximately 10 Hz and 10000 Hz, for example. As described above, the actuators 105 may be inertial, resonant, or vibration actuators, or may be part of actuator systems having inertial, resonant, or vibration characteristics.

A control circuit 102 for use in an embodiment hereof may be a collection of components configured for controlling the vibration actuators 105. In embodiments, a control circuit 102 may include an integrated circuit including components dedicated to providing the haptic control functionality. For example, the control circuit 102 may include an application specific integrated circuit ("ASIC"), a programmable gate array ("PGA"), a field programmable gate array ("FPGA"), system on a chip ("SoC"), or other type of integrated circuit. In further embodiments, the control circuit 102 may be implemented entirely in hardware components and may include various electronics components configured to perform the functionality discussed herein. In further embodiments, the control circuit 102 may be at least partially or completely implemented by a processor 108 that is configured to implement further functionality of the haptically enabled device 100. In other embodiments, the functionality of the control circuit 102 may be performed by any combination of hardware and software capable of performing the required computations.

In an embodiment, the haptically enabled device 100 further includes a display 106, at least one processor 108, at least one memory unit 120, user input elements 110, audio outputs 109, and one or more communication units 112.

The haptically enabled device 100 may include one or more processors 108 and one or more memory units 120. The processor 108 may be programmed by one or more computer program instruction stored in the memory unit(s) 120. The functionality of the processor 108, as described herein, may be implemented by software stored in the memory unit(s) 120 or another computer-readable or tangible medium, and executed by the processor 108. As used herein, for convenience, the various instructions may be described as performing an operation, when, in fact, the various instructions program the processors 108 to perform the operation.

The various instructions described herein may be stored in the memory unit(s) 120, which may comprise random access memory (RAM), read only memory (ROM), flash memory, and/or any other memory suitable for storing software instructions. The memory unit(s) 120 may store the computer program instructions (e.g., the aforementioned instructions) to be executed by the processor 108 as well as data that may be manipulated by the processor 108.

The user input element(s) 110 of FIG. 1 for use with embodiments hereof may include one or more elements suitable for accepting user input. These may include buttons, switches, dials, levers, touchscreens, touchpads, and the like. The user input elements 110 may further include peripherally connected devices, such as mice, joysticks, game controllers, keyboards, and the like. User input elements 110 may further include cameras, radar devices, lidar devices, ultrasound devices, and other devices configured to remotely capture user gestures.

A communication unit 112 in accordance with embodiment hereof may include one or more devices or components configured for external communication. The communication unit may include wired communication ports, such as USB ports, HDMI® ports, A/V ports, optical cable ports, and any other component or device configured to receive or send information in a wired fashion. The communication unit may further include wireless communication devices, such as BLUETOOTH® antennas, WI-FI® antennas, cellular antennas, infrared sensors, optical sensors, and any other device configured to receive and/or transmit information wirelessly. In further embodiments, the communication unit 112 may include ultrasound speakers and microphones configured to transmit information via ultrasonic soundwaves.

A display 106 for use with embodiments hereof may be a screen or other type of visual device for providing a visual output to a user. The display 106 may include touchscreen capabilities (e.g., and therefore serve as a user input element 110 as well). The display 106 may be of any size, shape, or configuration to fit the needs of the haptically enabled device 100. In some embodiments of haptically enabled device 100, such as a wearable device configured for delivering haptic effects, no display 106 is required. In embodiments, the display 106 may include a head-mounted display, such as a VR, AR, or MR headset, goggles, and/or other VR/AR/MR display device. In embodiments, the display 106 may be projected, either onto a surface or for display in the air.

Audio output(s) 109 include one or more devices configured to provide an audio output to a user. Audio output(s) 109 may include speakers as well as audio output ports, such as headphone jacks, configured for delivering an audio signal to a speaker or headphones.

Figure 2:
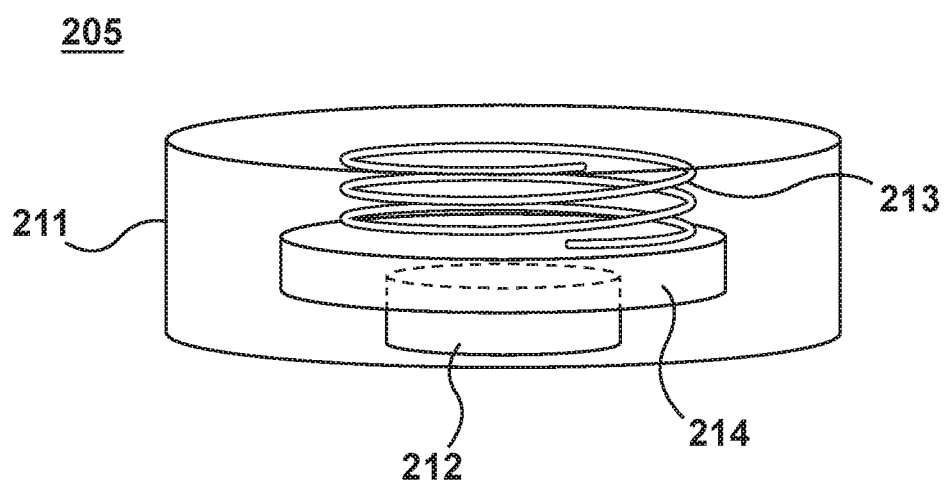
FIG. 2 illustrates an actuator consistent with embodiments hereof.

FIG. 2 illustrates an actuator 205 consistent with embodiments hereof. The actuator 205 is illustrated as an LRA actuator for explanatory purposes. The actuator 205 includes at least a housing 211, an inertial element 214, a driving element 212, and a spring element 213. The housing 211 includes the inertial element 214, the driving element 212, and the spring element 213. In embodiments, the housing 211 may not be required. Actuators consistent with embodiments hereof may further include a damping element, either as an explicit component of the actuator or system or implicitly included as in all mechanical systems. Accordingly, in embodiments, the actuator 205 forms a mass-spring-damper system with force or other input provided by the driving element 212. Although the inertial element 214 provides inertia, and the spring element 213 provides spring characteristics, it is understood that the characteristics of the mass-spring-damper system of the actuator 205 depend on all elements of the system—e.g., the housing may contribute to the mass or spring characteristics of the system. Further, when included in a haptic device or mounted to any device, the system characteristics may be further affected.

In an LRA actuator, as pictured in FIG. 2, the inertial element 214 may be a movable mass, the driving element 212 may be a voice coil, and the spring element 213 may be a wave spring, coil spring, or other spring. In different types of actuators or actuator systems, the inertial element 214, the driving element 212, and the spring element 213 may be formed from alternative hardware. For example, in an actuator system including a macrofiber composite actuator mounted on a substrate, the macrofiber composite actuator may provide the driving element 212, and the substrate may provide both the inertial element 214 and the spring element 213. The form factor of the actuator 205 as presented in FIG. 2 is by way of example only, and, as discussed above, the methods described herein may be applied to any actuator or actuator system having inertial, vibration, or resonant properties.

To produce a haptic effect, the actuator 205 is driven by a driving signal provided to the driving element 212. As used herein, the term "driving signal" refers to a control signal provided to an actuator and configured to generate motion in the actuator (e.g., motion of the inertial element 214) to cause haptic effects. In embodiments, the driving signal is a sine wave delivered at a driving signal frequency corresponding to the frequency of the intended haptic effect. However, other types of waves may be employed. In embodiments, the driving signal may be provided at a resonant frequency of the actuator 205 or of a system in which the actuator 205 is incorporated. The driving signal may further be characterized by an amplitude, a duration, and/or a number of peaks. Additionally or alternatively, in embodiments, the driving signal may be characterized by a number of oscillation half-cycles. In operation, the driving signal causes the actuator 205 to oscillate at the driving signal frequency. The frequency response of the actuator 205 or actuator system may exhibit phase lag with respect to the driving signal, as discussed below with respect to FIG. 3. In embodiments, the driving signal may be more complex than a single sine wave and may include signal components at more than one frequency.

Figure 3:
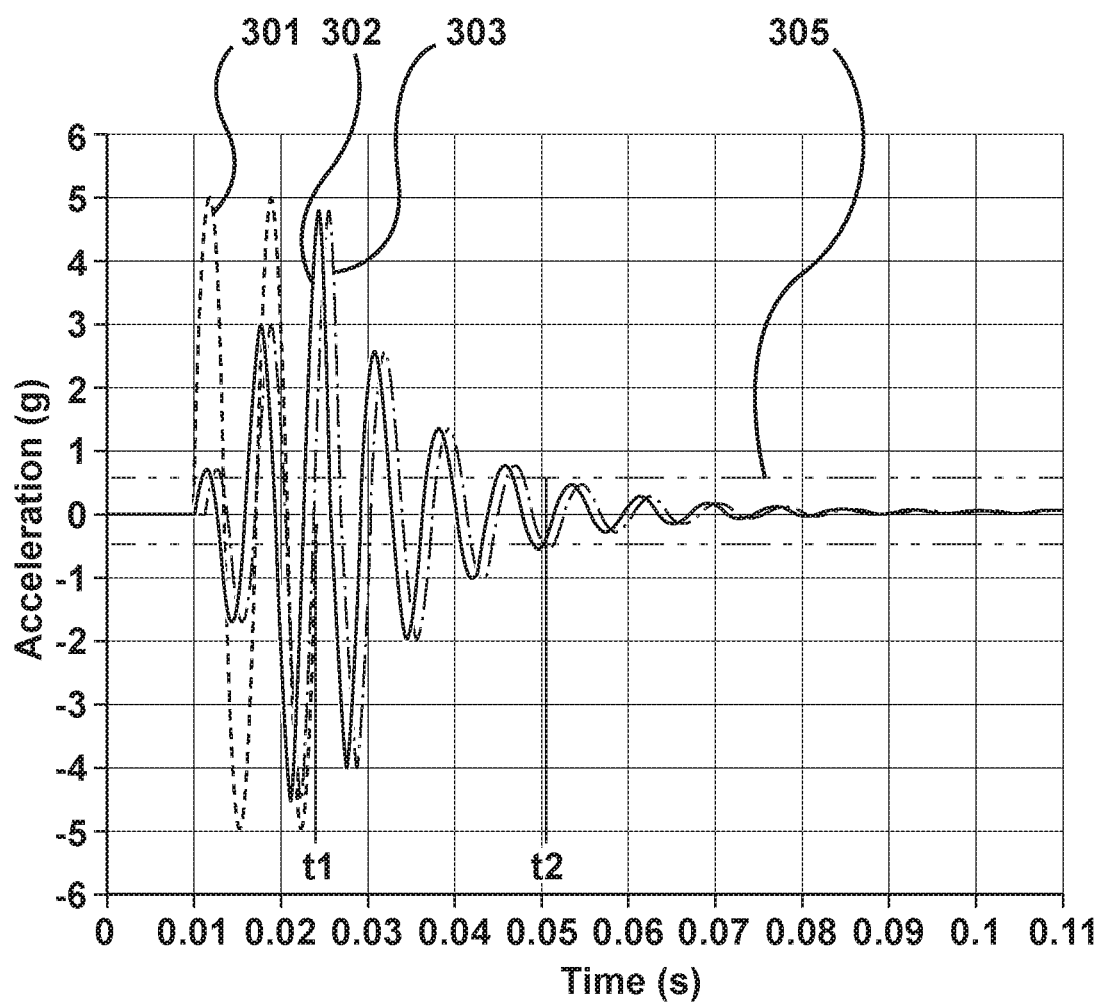
FIG. 3 is a graph illustrating a response of an actuator.

FIG. 3 illustrates the frequency response (or, more generally, the response) of an actuator consistent with embodiments hereof More specifically, FIG. 3 depicts a driving signal 301, which is applied to the actuator 205 of FIG. 2, and further depicts natural energy dissipation after cessation of the driving signal 301. The driving signal 301 may be characterized by amplitude, frequency, and number of peaks. As illustrated in FIG. 3, the characteristic values of the driving signal 301 are, e.g., 5 volts amplitude, 140 Hz frequency, and 4 peaks. The motion of the inertial element 214 of the actuator 205, when driven by the driving signal 301, demonstrates oscillatory motion that is characterized by an acceleration trace 302 and a velocity trace 303. As shown in FIG. 3, the acceleration trace 302 and the velocity trace 303 have the same frequency as the driving signal 301 but are out of phase with each other. For example, the acceleration trace 302 and the velocity trace 303 are 90 degrees out of phase with each other. The velocity reaches a maximum when the acceleration is zero, and the acceleration reaches a maximum when the velocity is zero. Each of the acceleration trace 302 and the velocity trace 303 are also out of phase with the driving signal 301.

In embodiments, a driving signal 301 may be characterized by two of three values selected from duration, frequency, and number of peaks. Knowledge of any two of these values permits the determination or understanding of the third.

After cessation of the driving signal 301 at time t1 (i.e., the end of the intended haptic effect), the energy of the actuator 205 is permitted to naturally dissipate, resulting in system oscillations of decreasing amplitude. At time t2, the natural energy dissipation has caused the magnitude of the acceleration trace 302 to drop below 0.5 g, which may be a haptic perceptibility threshold 305 in some embodiments. The difference between time t1 and time t2 is approximately 30 ms. Thus, the natural cut-off period for the haptic effect illustrated in FIG. 3 is approximately 30 ms.

Figure 4:
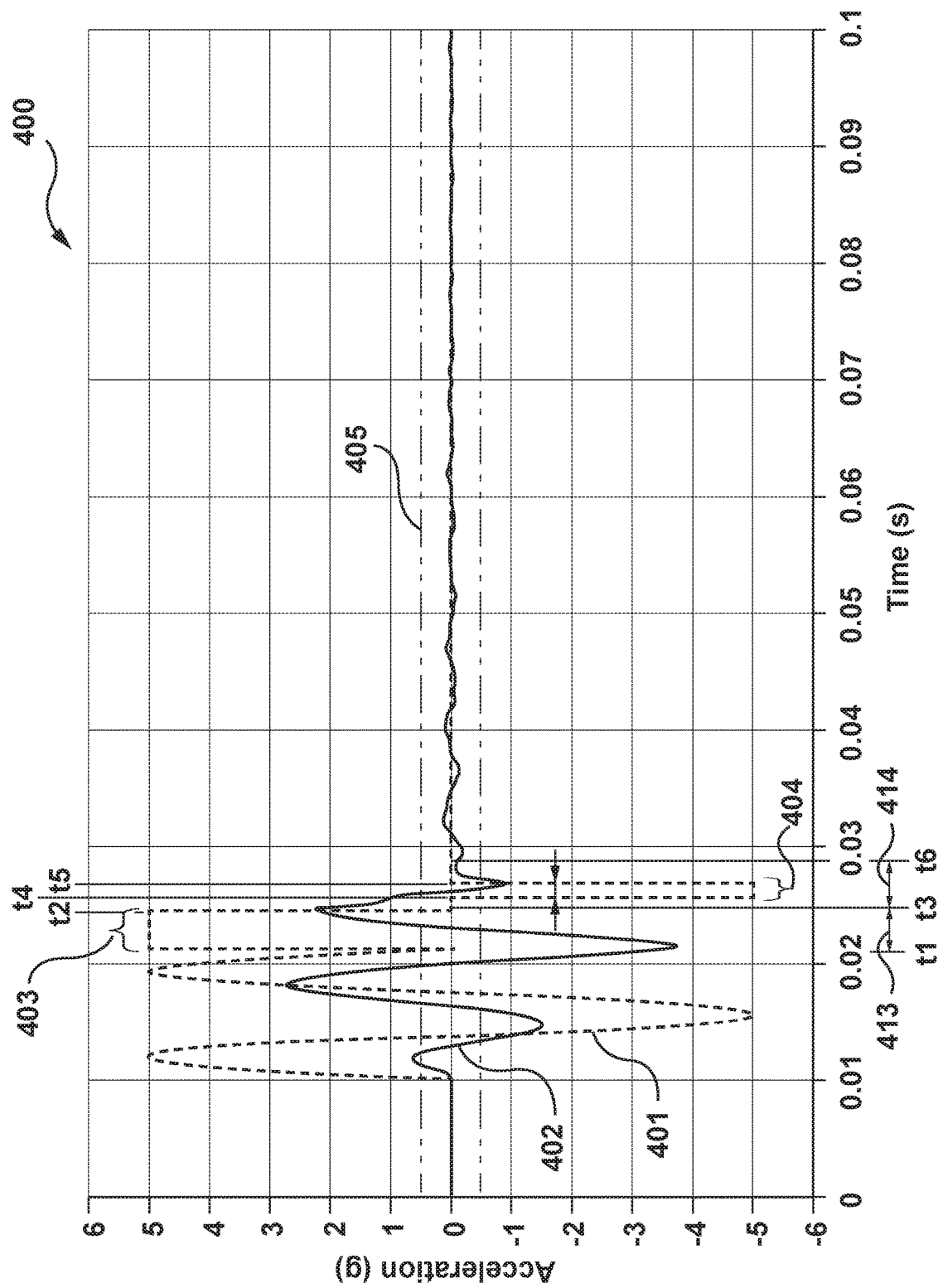
FIG. 4 is graph illustrating application of braking signal consistent with embodiments hereof.

FIG. 4 illustrates the acceleration trace and velocity traces of an actuator when a braking signal consistent with embodiments hereof are applied. As used herein, the term "braking signal" refers to a control signal provided to an actuator and configured to reduce motion of the actuator or actuator system so as to reduce, diminish, and/or eliminate haptic effects. In the example of FIG. 4, the actuator 205 is driven by a control signal 400, which is made up of a driving signal 401 and a braking signal 403. When driven by the driving signal 401, the actuator 205 responsively produces an acceleration trace 402. After cessation of the driving signal 401, one or more braking signals are applied. As shown in FIG. 4, a first braking signal 403 and a second braking signal 404 are applied to reduce the motion of the actuator. The first braking signal 403 and the second braking signal 404 cause a reduction in the amplitude of the acceleration trace 402, e.g., to reduce the haptic effect below a haptic perceptibility threshold 405. FIG. 4 illustrates the use of two braking signals 403, 404 as meeting the energy dissipation requirement of an actuator system. The use of two braking signals is by way of example only, and more or fewer may be used.

The braking signals 403, 404 may be provided in the form of square waves, for example. The following discussion of braking signals applies to braking signals in the form of square waves. The methods described herein, may be adapted for braking signals having other shapes.

Systems consistent with embodiments hereof operate by applying successive braking signals during specifically determined braking windows to reduce the total actuator system energy below an amount required to create a haptic perceptibility threshold. As discussed in more detail below, analysis of the driving signal provides the information required to determine when to apply the braking signals and how long to apply the braking signals. The duration and timing of the braking signals may be determined as follows.

The amount of energy required to be removed from the system to eliminate the haptic effect and bring the actuator to rest, i.e., the energy dissipation requirement, may be estimated according to an analysis of the driving signal. That is, the driving signal provides energy to the actuator system. An analysis of the driving signal characteristics permits the measurement of the energy added to the system and thus provides the necessary information to determine the energy dissipation requirement. A series of braking signals are then applied during successive braking windows to at least partially meet the energy dissipation requirement. The series of braking signals are applied to reduce the actuator system energy below a haptic perceptibility threshold, after which natural dissipation is permitted to reduce or eliminate any additional actuator system energy. The total duration of the braking signals is determined according to the energy dissipation requirement through a comparison between the input energy provided to the system by the driving signal and the energy removed from the system by the cumulative braking signals.

A total duration of required braking is estimated to meet the energy dissipation requirement of the system. In aspects, the total duration of required braking is reduced by various safety factors applied to successive braking signals to determine the duration of applied braking to meet the haptic perceptibility threshold. The energy dissipation requirement is determined according to an amount of energy added to the system by the driving signal. In some cases, the duration of the braking signal may be based on a frequency or period of the driving signal, an amplitude of the driving signal, and/or a number of peaks of the driving signal. More specifically, the energy input into the system by a driving signal may be represented as $$E_{drv} = \frac{V_D^2}{2*R} * \left(t_{drv} - \frac{\sin(4\pi f * t_{drv})}{4\pi f}\right)$$

where $E_{drv}$ represents the energy added by the driving signal, VD equals the amplitude of the input voltage of the driving signal, $t_{drv}$ equals the time over which the driving signal is applied, R equals the system resistance, and f equals the frequency of the driving signal. For scenarios where the driving signal has an integer number of peaks ($n_p$), this equation may be reduced to $$E_{drv} = \frac{V_D^2 * n_p}{4 * R * f}.$$

The energy removed from the system by the braking signal may be represented as $$E_{brk} = \frac{V_B^2 * t_B}{R},$$

where $E_{brk}$ represents the energy removed by the braking signal, $V_B$ equals the input voltage of the braking signal, $t_B$ equals the total braking duration and, R equals the system resistance. Setting the amount of energy removed from the system to be equal to the amount of energy input to the system yields:

$$E_{drv} = E_{brk} = \frac{V_D^2 * n_p}{4 * R * f} = \frac{V_B^2 * t_B}{R}.$$

Solving these equations for $t_B$ determines the total duration of braking required and provides the result $$t_B = \frac{n_p}{4 * f} * \frac{V_D^2}{V_B^2}.$$

If the braking signal is applied at the same amplitude as the driving signal, this equation can be further reduced to $$t_B = \frac{n_p}{4 * f}.$$

Finally, substituting in the period T of the driving signal to replace 1/f, the end result is $$t_B = \frac{n_p}{4} * T.$$

The above results for the determination of the energy dissipation requirement may differ for a system that has reached a steady state. Once the actuator system has reached steady state, the total system energy no longer increases. In such a situation, a value for $n_p$ representing the number of peaks required to reach steady state may be used. For extended duration haptic effects, this set value of $n_p$ may be used.

In embodiments, where $n_p$ is not an integer value, the estimation of the system energy and energy dissipation requirement may be carried out according to the unreduced energy equation, $$E_{drv} = \frac{V_D^2}{2 * R} * \left( t_{drv} - \frac{\sin(4\pi f * t_{drv})}{4\pi f} \right)$$

based on a duration characteristic of the driving signal.

The required braking energy $E_{brk}$ may be applied via a series of braking signals configured to provide braking energy in opposition to a velocity of the system. By delivering the braking signal in opposition to the system motion, it ensures that energy is removed from rather than added to the system. For instance, the braking energy $E_{brk}$ may be created by applying a voltage signal or any other braking signal having, e.g., a first polarity. Because the voltage signal is being applied to oppose motion of the actuator system (e.g., an inertial element 214 in the actuator system), then the motion of the inertial element 214 may have a second and opposite polarity while the voltage signal has the first polarity. In other words, by generating a force that opposes motion of the inertial element 214, the braking signal causes energy to flow out of the actuator system. For example, the force generated by the braking signal may slow the inertial element 214 and thus reduce its kinetic energy. As a result, if the braking signals are applied in a manner that opposes motion within the actuator system, they may withdraw or otherwise dissipate energy from the actuator system.

The braking signals are applied during braking windows selected based on the driving signal. The application and duration of the braking signals may further be modified by safety factors to account for uncertainties in the system. Due to the oscillatory motion of the actuator, the most efficient way to apply braking is in opposition to the inertial movement of the actuator. To ensure a reduction in system energy, each braking signal must be provided in opposition to a velocity of the system (e.g., velocity of the inertial mass 214). For example, when the velocity of the system is negative or is otherwise in a first direction, a positive braking signal must be applied to create a force in a second and opposite direction. When the velocity of the system is positive (e.g., in a positive direction), a negative braking signal (e.g., a braking signal having a negative voltage) must be applied.

In an embodiment, the onset timing and a duration of the braking windows are determined according to the driving signal frequency and number of peaks in the driving signal. The braking windows, whether there are one, two, or more, each have duration of half a period associated with the driving frequency. Each braking window has an onset timing t=n/2f, where n is an integer number. For the first braking signal, applied after cessation of the driving signal, n=$n_p$, i.e., the number of peaks of the driving signal. Each respective braking window ends at time t=(n+1)/2f (e.g., 1/f, 3/2f, 2/f, etc.), and the next respective braking window begins at the same time. The first braking window begins at the first t=n/2f timing after the end of the driving signal. Thus, the braking windows are determined to have the same timing as the driving signal. The driving signal crosses zero at times t=n/2f, and the braking windows each begin and end at t=n/2f.

Within each braking window, a braking signal is applied. Each braking window, however, may not correspond exactly with the motion of the system. By this it is meant that, when velocity of the actuator has a sine wave, the zero-crossings of the velocity sine wave may not occur at the same time as the zero crossings of the driving signal and the beginnings and endings of the braking windows. As discussed above, the braking windows are selected to correspond with the driving signal timing—the driving signal zero crossings occur at the beginnings and endings of the braking windows. As noted above with respect to FIG. 3, there may be phase lag between the response of the inertial system and the driving signal. The amount of phase lag depends on the specific system, and depends on the inertial element, spring element, and damping element of the system as well as the frequency of the driving signal. In a theoretical ideal system driven at a resonant frequency, the system response does not exhibit phase lag. Due to non-idealities between real-world systems and theoretical systems, phased lag can be introduced. Further, when the driving signal differs from the resonant frequency, phase lag can be introduced. Phase lag may cause the system velocity timing to not correspond exactly with the braking windows. Within each braking window, therefore, the velocity may cross zero and switch signs. If the braking signal is applied for the entirety of each braking window, it may add energy to the system during a portion of the braking window after the velocity has switched signs. Additionally, application of the braking signal may also introduce additional phase lag.

As stated above, the driving signal may in some situations cause a velocity of actuator motion to be in phase with the driving signal when the driving signal has a frequency which matches a resonant frequency of the actuator or actuator system. More specifically, if the driving signal is a periodic signal (e.g., a periodic voltage signal) which causes a periodic driving force or driving displacement, such as $D(t)=A \cos(w_{drv}t)$, to be exerted on the actuator system, then position $x(t)$ of the actuator system may be solved based on the equation $$\frac{d^2x(t)}{dt} + \beta\frac{2d(x)}{dt} + w_{resonance}x(t) = A\cos(w_{drv}t).$$

In this example, A represents an amplitude of the periodic driving force or driving displacement, $w_{drv}$ is an angular frequency of the driving signal and a frequency of the driving force or driving displacement, $w_{resonance}$ is a resonant frequency of the actuator system, and $\beta$ is a parameter representing damping loss in the actuator system. In one example solution, $$x(t) = \frac{A}{\sqrt{(w_{resonance}^2 - w_{drv}^2)^2 + 4\beta^2 w_{drv}^2}}\cos(w_{drv}t - \varphi),$$

wherein $\varphi$ represents a phase lag in the position $x(t)$ relative to the driving signal and to the driving force. In this solution, the phase lag $\varphi$ may be equal to arctan $$\left(\frac{2\beta w_{drv}}{(w_{resonance}^2 - w_{drv}^2)}\right).$$

When $w_{drv}=w_{resonance}$, the phase lag $\varphi$ for the position $x(t)$ is 90 degrees out of phase with the driving signal and with the driving force. The velocity $v(t)$ of the actuator system may be determined based on a derivative of $x(t)$, such that $$v(t) = \frac{-Aw_{drv}}{\sqrt{4\beta^2 w_{drv}^2}}\sin(w_{drv}t - \varphi),$$

wherein $\varphi$ is 90 degrees. The expression for the velocity $v(t)$ may also be expressed as $$\frac{-Aw_{drv}}{\sqrt{4\beta^2 w_{drv}^2}}[\sin(w_{drv}t)\cos\varphi - \cos(w_{drv}t)\sin\varphi].$$

When $\varphi$ is 90 degrees, the expression simplifies to $$v(t) = \frac{Aw_{drv}}{\sqrt{4\beta^2 w_{drv}^2}}\cos(w_{drv}t) = \frac{w_{drv}}{\sqrt{4\beta^2 w_{drv}^2}}D(t) = \frac{1}{2\beta}D(t).$$

Thus, when the driving signal frequency is equal to the resonance frequency, the velocity $v(t)$ may be in phase with the driving force $D(t)$ and with the driving signal. Accordingly, when the driving signal reaches a zero crossing and is about to change polarity, the velocity may also be reaching a zero crossing and is about to change polarity, such as from a first polarity to a second polarity. In such a situation, the braking signal may be generated to have an opposite polarity, so as to oppose a velocity of the actuator system. More particularly, because the velocity is also switching to the second polarity (because it is in phase with the driving signal), then a beginning of the braking signal may have the first polarity, so as to oppose the velocity of the actuator system.

In one example, the first braking signal is applied at the beginning of the first braking window, which coincides with the end of the driving signal at a zero crossing. The first braking signal is characterized by an amplitude, a polarity, and a duration. At the outset of the first braking window, the first braking signal is applied with a signal having the same polarity as the last peak of the driving signal. In embodiments, the amplitude may be selected as a maximum voltage that the actuator system can safely output. In embodiments, the amplitude of the first braking signal is selected or otherwise determined to correspond to the amplitude of the driving signal. The duration of the first braking signal is selected according to the length of the first braking window (e.g., 1/2f) as modified by a first braking signal safety factor $\gamma_1$. In an embodiment, the safety factor $\gamma_1$ is less than one and greater than zero. The closer the first braking signal safety factor $\gamma_1$ is to one, the longer the braking signal application will be. A longer braking signal results in the application of more braking energy (which can remove more energy from the actuator system) and can result in a shorter braking time. A longer braking signal also runs a greater risk of adding energy to the system because the longer braking signal may be more likely to have portions in which the braking signal is not opposing actuator motion. A shorter braking signal is less likely to add energy to the system, but also reduces the total amount of energy applied.

As an example, the first braking signal therefore has a length of $\gamma/2f$ or $\gamma*T/2$. If the amplitude of the first braking signal is chosen or otherwise determined to equal the amplitude of the driving signal, the remaining required braking time is therefore $$t_B - \frac{\gamma}{2f} = \left(\frac{n_p}{4*f}\right) - \frac{\gamma}{2f} = t_{B_{Remain}} = \frac{1}{2f}\left(\frac{n_p}{2} - \gamma\right).$$

Where $t_{B\_Remain}$ is greater than zero, additional braking signals must then be applied to bring the total braking duration up to $t_B$. Reviewing the equation for $t_B$ Remain shows that, where the braking voltage and driving voltage have the same amplitude, the remaining brake time depends on the frequency f of the driving signal, the number of peaks of the driving signal, and the first braking signal safety factor $\gamma_1$.

The table below shows the required remaining brake time after the first braking signal, which varies depending on the first braking signal safety factor $\gamma_1$ and the number of peaks $n_p$. The amount of time remaining is presented as a function of braking window duration (1/2f). Thus, for example, it can be seen that, for a first braking signal safety factor $\gamma_1$ equal to 0.9 and a 3 peak driving signal, a second braking signal with a duration equal to 60% of a braking window is required. For a four and a five peak driving signal, because $t_{B\_Remain}$ is greater than one (i.e., larger than a full braking window), two additional braking signals are required. The table below includes a limited number of values for illustration purposes only. The driving signal is not limited to the listed number of peaks, and the first braking signal safety factor $\gamma_1$ is not limited to the listed values.

TABLE 1

| $\gamma_1$ | $n_p$ | $t_{B\ Remain}$ |
|---|---|---|
| 0.9 | 2 | 0.1*(1/2f) |
| 0.9 | 3 | 0.6*(1/2f) |
| 0.9 | 4 | 1.1*(1/2f) |
| 0.9 | 5 | 1.6*(1/2f) |
| 0.85 | 2 | 0.15*(1/2f) |
| 0.85 | 3 | 0.65*(1/2f) |
| 0.85 | 4 | 1.15*(1/2f) |
| 0.85 | 5 | 1.65*(1/2f) |
| 0.8 | 2 | 0.2*(1/2f) |
| 0.8 | 3 | 0.7*(1/2f) |
| 0.8 | 4 | 1.2*(1/2f) |
| 0.8 | 5 | 1.7*(1/2f) |

In embodiments where the braking signal is chosen or generated to have a different amplitude than that of the driving signal (either more or less), then the full equations may be used. A braking signal of duration $\gamma/2f$ reduces the system energy by $$E_{brk} = \frac{V_B^2 * \gamma}{2 * f * R}.$$

This is then compared to the total energy dissipation requirement to determine the remaining energy to be dissipated and the necessary remaining braking duration. The equation for remaining energy is thus:

$$E_{rem} = \frac{V_B^2 * t_{B\_Remain}}{R} = \frac{V_D^2 * n_p}{4 * R * f} - \frac{V_B^2 * \gamma}{2 * f * R}.$$

In such embodiments, the various characteristics of the first and subsequent braking signals, e.g., the start time, duration, magnitude, etc., may be further based on an amplitude of the driving signal. In embodiments, the first braking signal may further be adjusted according to known characteristics of the system (e.g., system modeling) and/or experimental results.

After the first braking signal, second and subsequent braking signals are applied during second and subsequent braking windows. The characteristics of the subsequent braking signals are determined according to a comparison of input energy to the system provided by the driving signal and energy removed from the system by the first braking signal according to the above equations and example table. The second braking signal has a start time adjusted due to a second braking signal delay factor—a timing delay from the start of the second braking window. The second braking signal delay factor may be determined according to characteristics of the system (e.g., system modeling) and/or experimental results. Delaying initial application of the second braking signal from the start of the second braking window may further address phase lag, if any, between the driving signal and the system response. The delay serves to ensure that the second braking signal is applied in opposition to the velocity of the system.

In embodiments, a second braking signal safety factor $\gamma_2$ is introduced to the reduce the duration of the second braking signal. The second braking signal safety factor $\gamma_1$ is between 0 and 1. The second braking signal safety factor $\gamma_1$ is a tuning parameter selected according to characteristics of the system (e.g., system modeling) and/or experimental results The polarity of braking signals switches back and forth between a positive polarity and a negative polarity. Thus, if the first braking signal had a positive polarity, the second braking signal will have an opposite, negative polarity. If a third braking signal is applied, the third braking signal will have a polarity opposite that of the second braking signal, and therefore have the positive polarity.

If the second braking signal is a final braking signal, e.g., for a 3 peak driving signal, the second braking signal safety factor $\gamma_2$ may be selected to reduce or prevent over braking. Suitable values for the second braking signal safety factor $\gamma_2$ include, for example, 0.4, 0.5, 0.6 and any other number between 0 and 1. The energy dissipation requirement, as discussed above, is determined according to the amount of energy input into the actuator system. Because the actuator system is a real world system, the total amount of energy in the system is smaller than the input energy, due at least to friction and damping losses. In other words, because friction and damping losses already dissipate some of the energy that is input into the actuator system by the driving signal, braking signals which are too long or too strong may remove too much additional energy from the actuator system and may cause over-braking. To reduce or prevent over-braking, the duration of the second braking signal may be reduced by a second braking signal safety factor $\gamma_2$. A haptic perceptibility threshold will be crossed by the system (so that haptic effects can no longer be felt) while energy remains in the system. Thus, the second braking signal safety factor $\gamma_2$ is selected specifically to permit an amount of energy lower than that required to pass the haptic perceptibility threshold to remain in the system after the end of the second braking signal. This ensures that over braking does not occur. Thus, the energy dissipation requirement is met partially through the application of braking signals to reduce the energy below a haptic perceptibility threshold and partially through natural dissipation after cessation of the braking signals.

In embodiments, the second braking signal may not be a final braking signal (e.g., for a 5 peak driving signal, more than two braking signals may be generated and applied). In such embodiments, the second braking signal safety factor $\gamma_2$ is selected to address the same issues as the first braking signal safety factor $\gamma_1$. That is, the second braking signal safety factor $\gamma_2$ is selected to prevent the application of braking energy in the wrong direction, thereby adding energy to the system. The second braking signal safety factor $\gamma_2$ may differ from the first safety factor. For example, due to the delay of the second braking signal, the second braking signal safety factor $\gamma_2$ may be larger than the first factor, so as to prevent the second braking signal duration from resulting in the addition of energy to the system.

Additional braking signals (third, fourth, etc.) may be applied during additional braking windows. Each subsequent braking signal may include a delay and a safety factor $\gamma n$. Each additional braking signal may be applied with a safety factor $\gamma n$ selected to reduce the braking signal duration so as to ensure no energy is added to the system. The final braking signal may include a safety factor $\gamma n$ chosen to prevent over braking after system energy has been reduced such that haptic effects no longer exceed a haptic perceptibility threshold.

Returning now to FIG. 4, the duration, magnitude, polarity, and number of braking signals are determined by, e.g., the control circuit according to characteristics of the driving signal 401. The driving signal 401 is characterized by one or more of a driving signal frequency, a number of peaks, an amplitude, and/or a duration. FIG. 4 further illustrates the first braking signal 403, which may be characterized by any or all of a magnitude, polarity, start time, and duration. The second braking signal 404 is characterized by a magnitude, polarity, start time, and duration as well. The first braking signal 403 and the second braking signal 404 are applied during first and second braking windows 413 and 414, respectively. At least the duration of the first braking signal 403 and the second braking signal 404 and the duration of the first and second braking windows 413 and 414 are determined according to characteristics of the driving signal, as discussed in greater detail above. In an embodiment, the magnitude of the first and/or second braking signals 403, 404 may also be determined according to characteristics of the driving signal 401. In an embodiment, the magnitude of the first and/or second braking signal 403/404 may be predetermined based on characteristics of the control circuit and haptic enabled device with which the actuator is associated. For example, the magnitude of the braking signals may be a maximum safe voltage that can be applied to the actuator, or a predetermined percentage of such a voltage.

As an example, the driving signal 401 of FIG. 4 has 3 peaks, a frequency of 135 Hz, and a drive signal of 5 v. The braking signals 403, 404 are selected based on the driving signal characteristics so as to lower the energy of the actuator system such that any remaining energy in the system is below a haptic perceptibility threshold 405.

As depicted in FIG. 4, the driving signal 401 ends at time t1 when the driving signal ceases. The finish of the driving signal 401 represents the end of the intended haptic effect. Any haptic effects or other movement produced after the end of the driving signal 401 are undesirable, and reduction below the haptic perceptibility threshold 405 is desired as quickly as possible. The first braking signal may be applied during a first braking window 413, which is defined by the time between t1 and t3, to reduce the undesirable movement. The duration of the first braking window 413 is determined according to the frequency of the driving signal as 1/2f, and the start of the first braking window 413 is determined according to the frequency and number of peaks of the driving signal 401 and is equal to $t=(n_p)/2f$ at the cessation of the driving signal 401. The duration of the first braking window is 1/2f. The start time of the first braking signal is 3/2f. The length of the first braking signal 403, applied during the first braking window 413, is shorter than the duration of the first braking window 413 due to the application of the first braking signal safety factor $\gamma_1$. As shown in FIG. 4, the first braking signal 403 is applied for 0.9*(1/2f) seconds and ends at time t2. In the FIG. 4 example, the first braking signal 403 is applied with a voltage equal to that of the driving signal 401, e.g., 5 v.

After applying the first braking signal 403 with a first braking signal safety factor $\gamma_1$ and amplitude equal to the driving signal 401 (e.g., 5 v), $t_B$ Remain is 0.6*(1/2f), according to the equations and table shown above. A second braking window 414 is defined by the time between t3 and t6. The duration of the second (and subsequent) braking windows is determined by the frequency of the driving signal 401 as 1/2f. The start time of the second (and subsequent) braking windows is determined according to the frequency and number of peaks of the driving signal as $t=(n_p+B_n)/2f$, where $B_n$ is the braking window number.

After the end of the first braking signal 403 and the end of the first braking window 413 at time t3, the second braking window 414 begins and the second braking signal 404 is applied. The timing delay of the second braking signal 404, as shown in FIG. 4, is selected as 0.2*(1/2f) and the second braking signal 404 begins at time t4. The second braking signal 404 is applied opposite to the movement of the inertial element of the actuator system and opposite to the direction of the previous, first braking signal 403. The duration of the second braking signal 404 is determined according to an amount of energy required to meet the energy dissipation requirement after the energy dissipation or removal of the first braking signal 403 is taken into account, wherein the duration of the second braking signal 404 is reduced by or is otherwise determined based on the second braking signal safety factor $\gamma_2$. The first braking signal 403 reduces the initial energy dissipation requirement to a remaining energy dissipation requirement according to the amount of energy removed from the actuator system by the first braking signal 403. The characteristics of the second braking signal 404, e.g., the duration, timing, and magnitude, are determined according to the remaining energy dissipation requirement and the second braking signal safety factor $\gamma_2$. As discussed above, the remaining energy dissipation requirement may be expressed by the remaining braking time required, $t_{B\_Remain}$. The remaining braking time after the first braking signal 403 in this example is 0.6*(1/2f). In the embodiment of FIG. 4, the second braking signal 404 is the final braking signal, and the second braking signal safety factor $\gamma_2$ is selected to reduce the system energy below the haptic perceptibility threshold 405 without over braking. The second braking signal safety factor $\gamma_2$ is 0.5, and thus the second braking signal 404 is applied for 0.3*(1/2f) seconds. At the end of the second braking signal 404, remaining energy in the system is permitted to dissipate naturally. As shown in FIG. 4, the acceleration trace 402 drops below the haptic perceptibility threshold 405 shortly at time t5, at cessation of the second braking signal 404. Although the system continues to oscillate, the oscillations/vibrations are small and difficult or impossible to detect. The time required to reduce the system energy below the haptic perceptibility threshold 405 in this example is less than two full braking windows, e.g., less than full period of frequency or less than two half periods of the frequency. The quick reduction of system energy results in a sharp-cutoff haptic effect.

In FIG. 4, the acceleration trace 402 shows that the system energy drops below a level of haptic perceptibility at approximately the same time as when the second braking signal 404 ends. In embodiments, energy reduction below a level of haptic perceptibility may occur before or after a final braking signal ends. Due to potential uncertainties in the system and the nature of open loop control, the end of the final braking signal and energy reduction below a level of haptic perceptibility may not always coincide.

The system and methodology described above may be altered or adjusted to meet suitable system requirements without departing from the scope of the embodiments described herein. For example, in embodiments, a first braking window may be abbreviated by the length of the driving signal. For example, the driving signal may be provided for a time duration that does not coincide exactly with an integer number of half-periods. In such a case, a first braking window may have an abbreviated duration (e.g., less than a half period) equal to the time remaining in the half-period in which the driving signal 401 ended. In such a case, safety factors, durations, etc., of the first and subsequent braking signals may all be adjusted according to the principles described herein to achieve a sharp cutoff haptic effect. In another example, an extended duration haptic effect may be provided, including dozens or hundreds of peaks from the driving signal. In such a situation, energy dissipation requirements may be determined according to a number of peaks of the driving signal required to reach steady state.

Figure 5A:
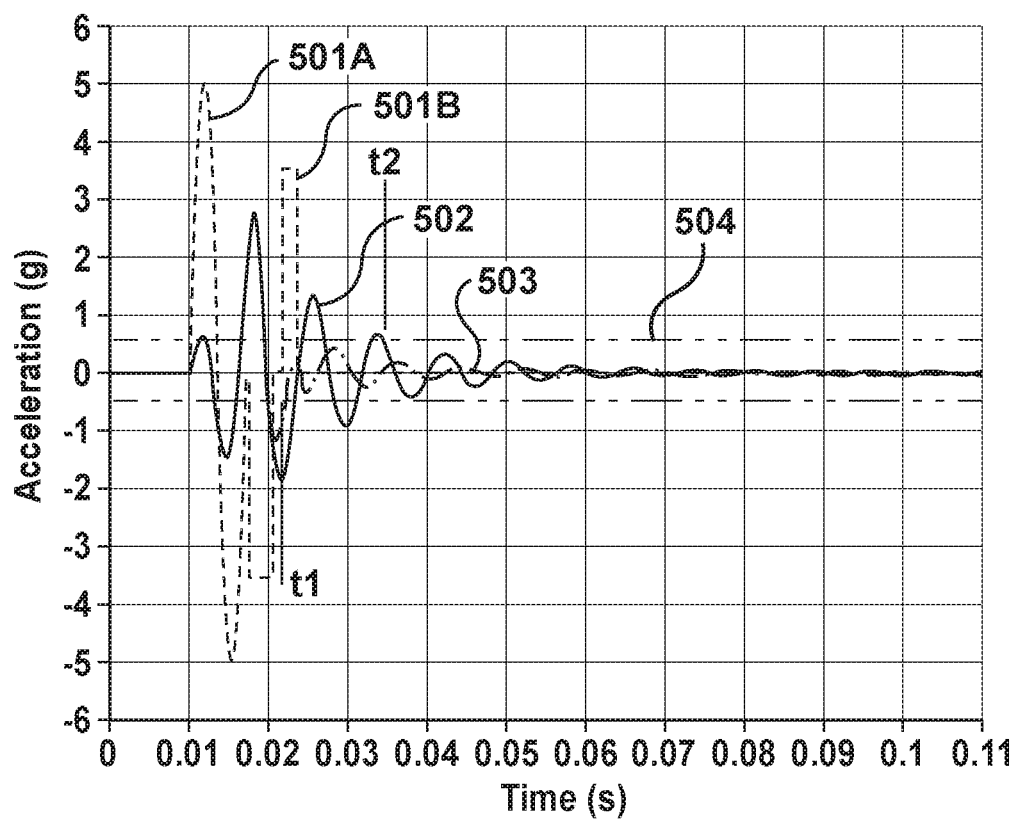
FIGS. 5A-5F illustrate comparisons of haptic effects provided by braked and unbraked actuators.
Figure 5B:
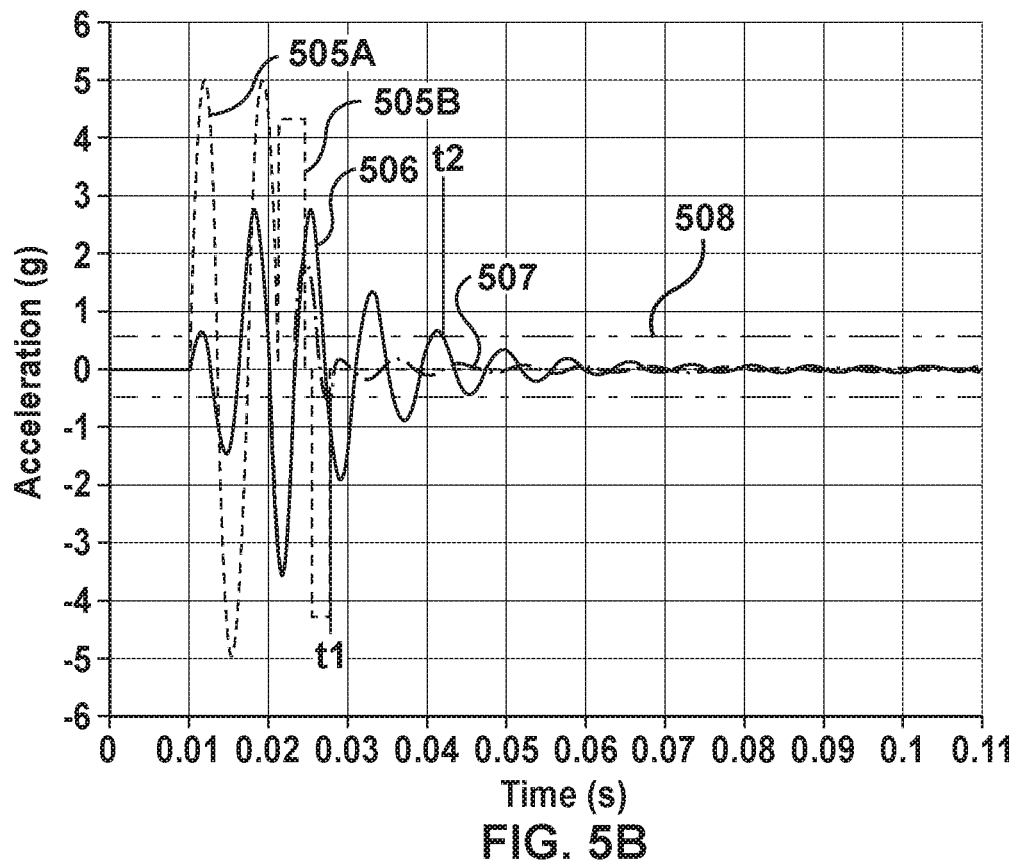
Figure 5C:
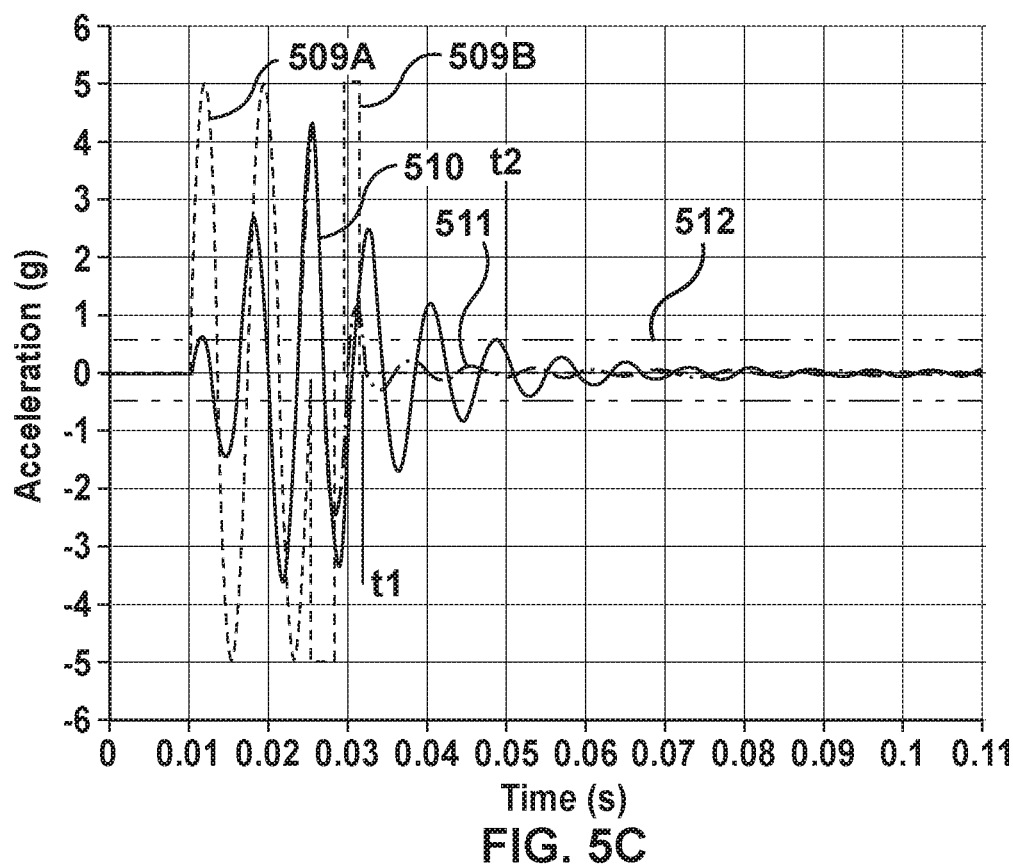
Figure 5D:
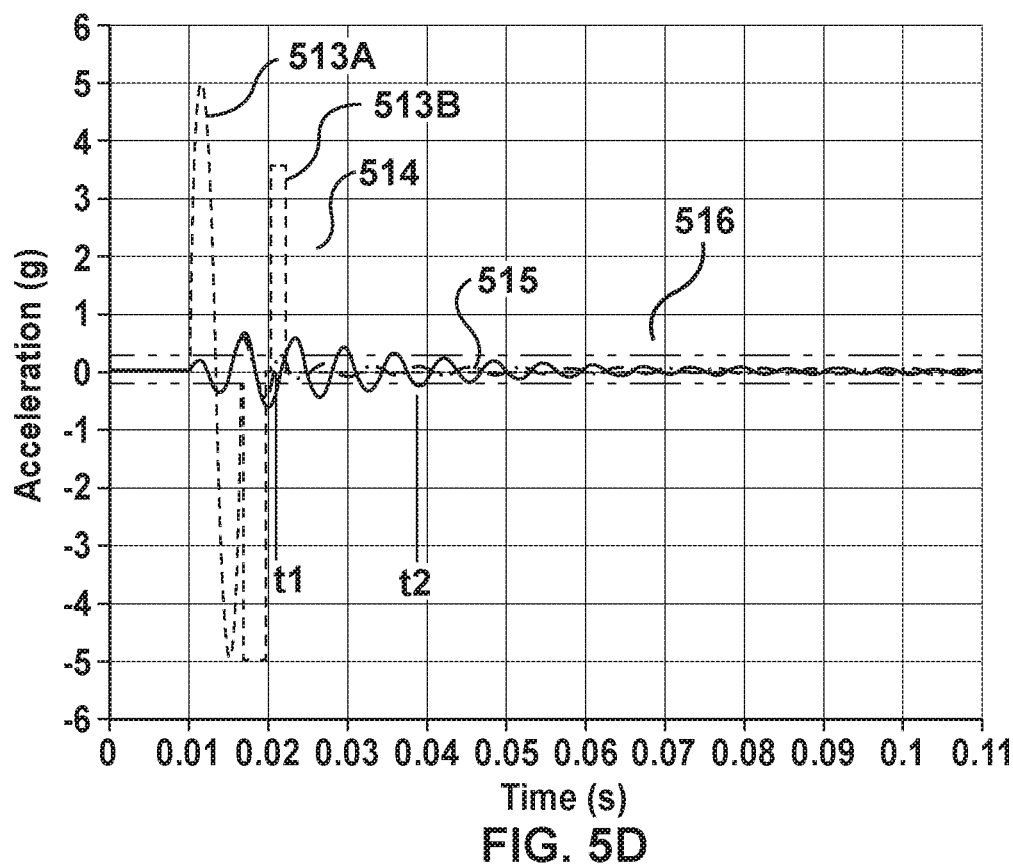
Figure 5E:
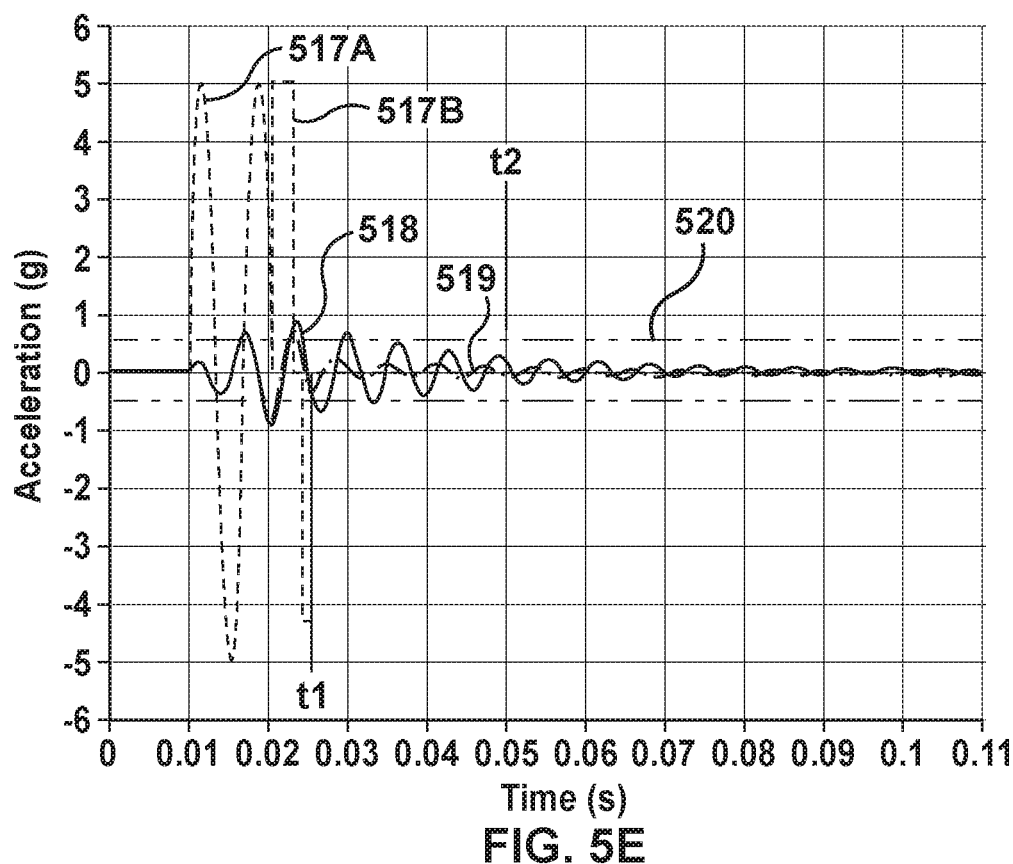
Figure 5F:
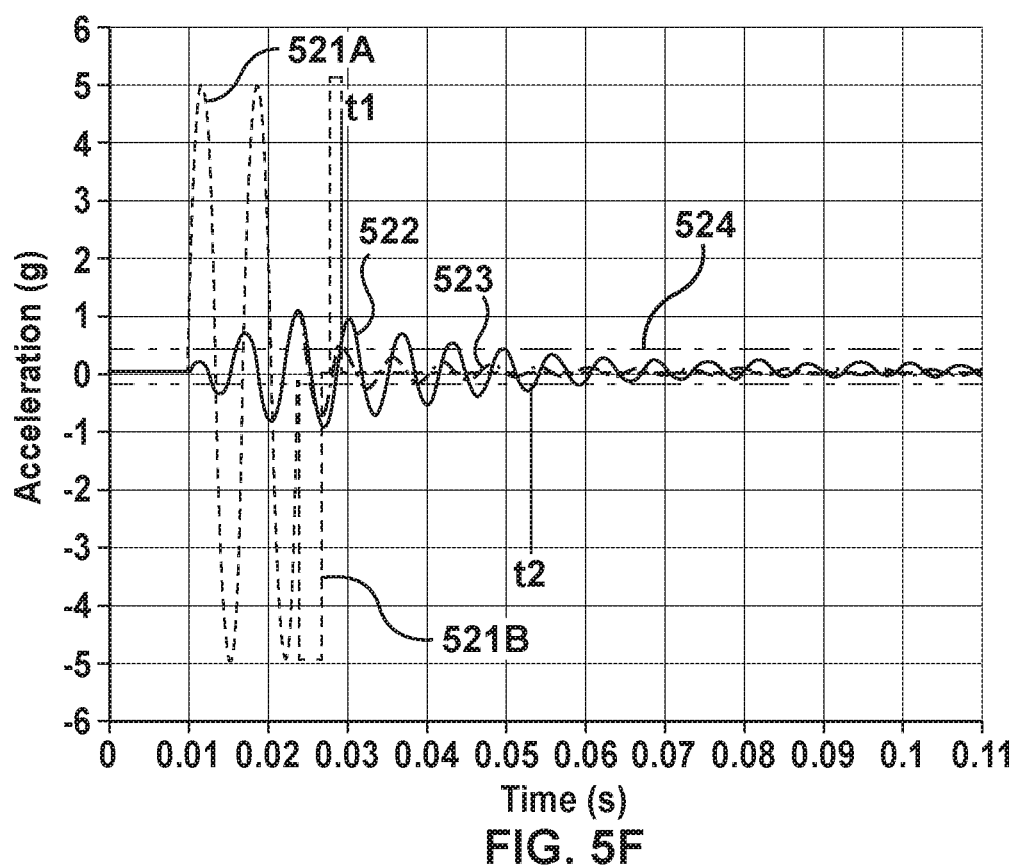

FIG. 5A-F illustrate the acceleration and braking responses for different types of actuators driven by different control signals. Each graph shows a control signal including a driving signal and a braking signal. In each graph, the braked response is compared to the free response. FIGS. 5A-5C show responses for a first LRA. FIGS. 5D-5F show responses for a second LRA, different than the first LRA.

FIG. 5A shows the acceleration and braking responses for a first LRA driven by a driving signal having two peaks. The control signal 501 includes both the driving signal 501A and the braking signal 501B and represents the control signal applied to the system. The free acceleration trace 502 represents the unbraked response of the actuator when the control signal 501 includes only the driving signal 501A. The braked acceleration trace 503 represents the braked response of the actuator when the control signal 501 includes both the driving signal 501A and the braking signal 501B. As shown, the braked response is reduced below the haptic perceptibility threshold 504 at t1, less than a full period after the end of the driving signal 501A, while the unbraked response is not reduced below the haptic perceptibility threshold 504 until t2, more than two full periods after the end of the driving signal 501A.

FIG. 5B shows the acceleration and braking responses for the first LRA driven by a driving signal having three peaks. The control signal 505 includes both the driving signal 505A and the braking signal 505B and represents the control signal applied to the system. The free acceleration trace 506 represents the unbraked response of the actuator when the control signal 505 includes only the driving signal 505A. The braked acceleration trace 507 represents the braked response of the actuator when the control signal 505 includes both the driving signal 505A and the braking signal 505B. As shown, the braked response is reduced below a haptic perceptibility threshold 508 at t1, less than a full period after the end of the driving signal 505A, while the unbraked response is not reduced below a haptic perceptibility threshold 508 until t2, more than two full periods after the end of the driving signal 505A.

FIG. 5C shows the acceleration and braking responses for the first LRA driven by a driving signal having four peaks. The control signal 509 includes both the driving signal 509A and the braking signal 509B and represents the control signal applied to the system. The free acceleration trace 510 represents the unbraked response of the actuator when the control signal 509 includes only the driving signal 509A. The braked acceleration trace 511 represents the braked response of the actuator when the control signal 509 includes both the driving signal 509A and the braking signal 509B. As shown, the braked response is reduced below a haptic perceptibility threshold 512 at t1, less than a full period after the end of the driving signal 509A, while the unbraked response is not reduced below a haptic perceptibility threshold 512 until t2, almost two full periods after the end of the driving signal 509A.

FIG. 5D shows the acceleration and braking responses for a second LRA driven by a driving signal having two peaks. The control signal 513 includes both the driving signal 513A and the braking signal 513B and represents the control signal applied to the system. The free acceleration trace 514 represents the unbraked response of the actuator when the control signal 513 includes only the driving signal 513A. The braked acceleration trace 515 represents the braked response of the actuator when the control signal 513 includes both the driving signal 513A and the braking signal 513B. As shown, the braked response is reduced below the haptic perceptibility threshold 516 at t1, less than a full period after the end of the driving signal 513A, while the unbraked response is not reduced below the haptic perceptibility threshold 516 until t2, almost two four full periods after the end of the driving signal 501A.

FIG. 5E shows the acceleration and braking responses for the second LRA driven by a driving signal having three peaks. The control signal 517 includes both the driving signal 517A and the braking signal 517B and represents the control signal applied to the system. The free acceleration trace 518 represents the unbraked response of the actuator when the control signal 517 includes only the driving signal 517A. The braked acceleration trace 519 represents the braked response of the actuator when the control signal 517 includes both the driving signal 517A and the braking signal 517B. As shown, the braked response is reduced below a haptic perceptibility threshold 520 at t1, less than a full period after the end of the driving signal 517A, while the unbraked response is not reduced below a haptic perceptibility threshold 520 until t2, more than four full periods after the end of the driving signal 517A.

FIG. 5F shows the acceleration and braking responses for the second LRA driven by a driving signal having four peaks. The control signal 521 includes both the driving signal 521A and the braking signal 521B and represents the control signal applied to the system. The free acceleration trace 522 represents the unbraked response of the actuator when the control signal 521 includes only the driving signal 521A. The braked acceleration trace 523 represents the braked response of the actuator when the control signal 521 includes both the driving signal 521A and the braking signal 521B. As shown, the braked response is reduced below a haptic perceptibility threshold 524 at t1, less than a full period after the end of the driving signal 521A, while the unbraked response is not reduced below a haptic perceptibility threshold 524 until t2, almost five full periods after the end of the driving signal 509A.

Figure 6:
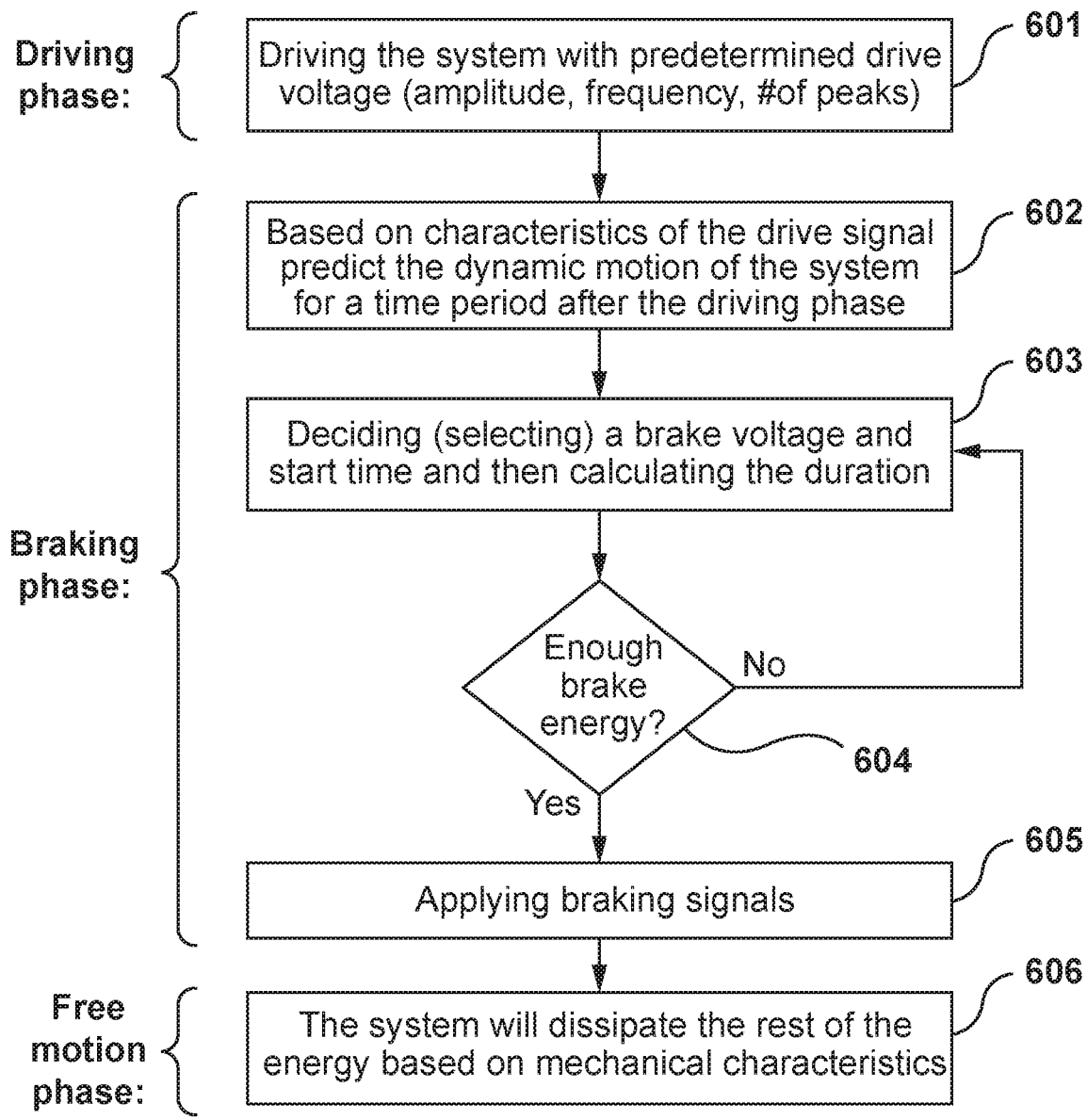
FIG. 6 illustrates a process of applying a braking signal consistent with embodiments hereof.

FIG. 6 illustrates a process of driving and braking an actuator system to produce a haptic effect with a sharp cutoff according to embodiments hereof. The process 600 may be implemented via a control circuit, at least one processor, or any other hardware control device discussed herein. The process 600 is used to drive and brake an actuator or actuator system so as to provide a haptic effect of limited or extended duration with a sharp cutoff. The process 600 includes a driving phase, a braking phase, and a free motion phase.

The driving phase of the process 600 includes an operation 601 of driving the system with a driving signal. The driving signal may be characterized by any or all of amplitude, frequency, and number of peaks. As discussed above, duration may also be used. In embodiments, the driving signal may be predetermined. In further embodiments, the driving signal may be dynamically determined, for example, based on user input to a device or on other factors.

The braking phase of the process 600 includes operations to determine and apply a braking signal. In an operation 602, the dynamic motion of the unbraked actuator system is determined based on one or more characteristics of the driving signal. For actuator systems consistent with embodiments hereof, the frequency response may be predicted based on the input driving signal. The frequency of the actuator system corresponds to that of the driving signal, and an input amount of energy is determined. The dynamic motion of the system may be predicted explicitly or implicitly. Explicit prediction of the driving system may include generating a direct prediction of the frequency response or movement of the system after cessation of the driving signal. Implicit prediction of the driving system may include determining the braking signals, e.g., by use of the reduced equations as discussed above, necessary to reduce the energy of the system without an intermediate step of determining the exact frequency response.

In an operation 603, a braking window and a braking signal to be applied during the braking window are determined. In this example, a braking voltage, braking start time, and braking duration are selected or calculated. In embodiments, the braking voltage may be a maximum voltage permitted by the control circuit and actuator system. In further embodiments, any braking voltage may be selected. A duration of the first braking signal is selected or calculated according to the frequency of the driving signal. In embodiments, the duration may be reduced from the duration of a full braking window according to a first braking signal safety factor $\gamma_1$, as discussed above. When operation 603 is entered for a first time, a first braking window and first braking signal to be applied during the first braking window are selected. During subsequent iterations of operation 603, subsequent braking windows and braking signals are selected.

In an operation 604, the braking signal(s) determined at operation 603 are compared to an energy dissipation requirement to determine whether additional braking signals are required. If the selected braking signals do not provide enough energy dissipation or removal to reduce the system energy below a haptic perceptibility threshold, operation 603 is repeated to determine an additional braking signal (e.g., a second or third braking signal) to be applied during an additional braking window.

In an operation 605, the braking signal(s) determined at operations 603 and 604 are applied to the system with the appropriate timing to reduce the actuator system energy below a haptic perceptibility threshold. Thus, the system proves to the actuator a first braking signal having a first braking signal duration based on the frequency associated with the driving signal. The system also provides to the actuator a second braking signal having at least one of a second braking signal duration based on the frequency associated with the driving signal and a start time based on the frequency and the number of peaks associated with the driving signal. The one or more braking signals determined during the operations 603 and 604 reduce the energy in the actuator system by a great enough to meet the haptic perceptibility threshold.

In an operation 606, after application of the braking signals and reduction of system energy below a haptic perceptibility threshold, any remaining energy in the system is permitted to naturally dissipate through damping inherent in the actuator system.

Operations 601 through 606 are described in a linear fashion for explanatory purposes but may be executed in a different order than that presented. For example, operations 602, 603, and 604, which include analysis of the driving signal and selection of the braking signals required based on the driving signal may be performed before any control signals are applied to the system. Thus, the driving signal and braking signals may be predetermined prior to the activation of the system by the driving signal at operation 601, the braking of the system by the braking signal at operation 605, and the free motion dissipation of remaining system energy at operation 606. In further examples, the braking signal may be dynamically determined during operation of the system. For example, the characteristics of the driving signal may be analyzed at operation 602 during provision of the driving signal at operation 601. Thus, the braking signals may be dynamically determined and selected at operations 603 and 604 during application of the driving signal for application upon completion of the driving signal.

In still further embodiments, a portion of the braking signal may be predetermined and a portion may be dynamically determined. For example, a first braking signal may be predetermined for application as soon as the driving signal is completed. The predetermined braking signal may be, for example, a maximum voltage signal lasting for a duration of half a period of the driving signal frequency times a first braking signal safety factor $\gamma$. During application of the first braking signal, the operations at 602, 603, and 604 may be performed to determine how much additional energy dissipation will be required to reduce the system energy below a haptically perceptibility threshold after completion of the first braking signal.

The process 600 represents a process by which a series of braking signals to provide a sharp cutoff haptic effect can be selected, either dynamically or predetermined, to provide the energy dissipation requirement to an actuator system. The braking signals may be selected based only on characteristics of the driving signal. The braking signals may be selected without any additional data, such as sensor data, accelerometer data, camera data, or any other data or sensed information about the actuator system response.

Figure 7:
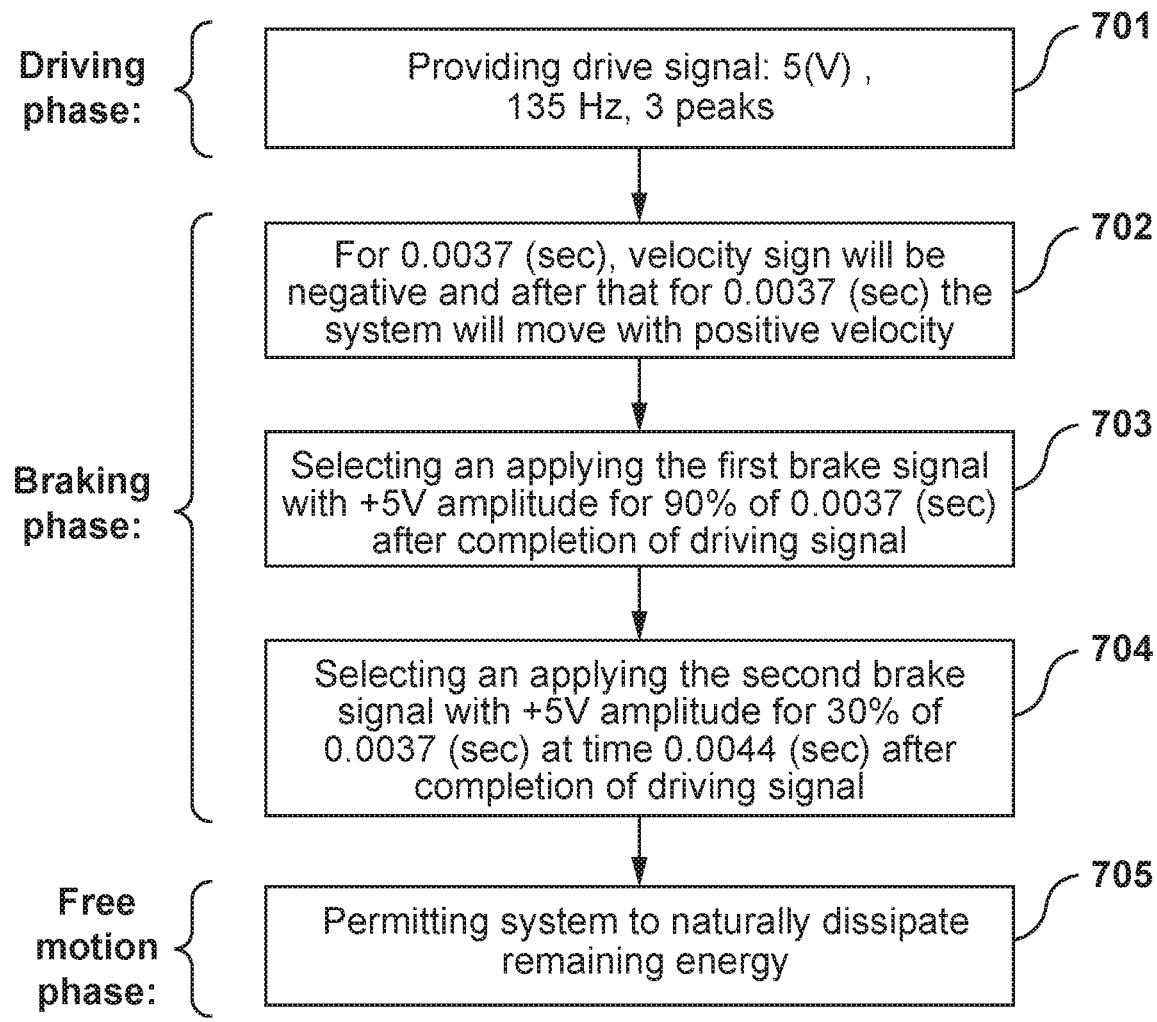
FIG. 7 illustrates a process of applying a braking signal consistent with embodiments hereof.

FIG. 7 illustrates a specific example implementation of the process 600 for providing a sharp cutoff haptic effect. Specific example values of a driving signal and a series of braking signals are provided to illustrate application of the process 600.

In an operation 701, a drive signal is provided to an actuator system to produce a haptic effect. The drive signal is provided by a control circuit, a processor, or any other suitable hardware associated with the actuator system. Operation 701 corresponds to operation 601, as described above. The provided drive signal is characterized by a voltage of 5 volts, a frequency of 135 Hz, and a duration corresponding to 3 peaks. A specific timing duration is not required, because the number of peaks is sufficient information to characterize the drive signal.

In an operation 702, the drive signal is analyzed and processed to determine the motion characteristics of the actuator system and to determine and select the required braking signals. Operation 702 corresponds to operation 602 as discussed above and includes a prediction of the free motion of the system after cessation of the driving signal. Because the frequency of the driving signal is 135 Hz, the response frequency is also 135 Hz and the period is $1/f \sim 0.0074$ seconds. Half of a period, or the duration of each peak, is therefore approximately $1/2f \sim 0.0037$ seconds. Because the driving signal has three peaks, it can be determined that the driving signal ceases at 3*0.0037 seconds, or approximately 0.0111 seconds. A three peak driving signal includes two positive peaks and one negative peak. Accordingly, the ideal velocity will be negative for 1/2f 0.0037 seconds after the end of the driving signal and positive for 1/2f~0.0037 seconds after that.

In operations 703 and 704, which correspond to operations 603, 604, and 605, as discussed above, the first braking signal and the second braking signals, respectively, are determined and applied according to the prediction of free system motion made in operation 702.

In operation 703, the first braking signal is selected and applied during the first braking window. The full duration of the braking windows is also ~0.0037 seconds, corresponding to the predicted free motion. The first braking window begins at ~0.0111 seconds. In this example, a maximum amplitude voltage of 5 v, corresponding to the drive signal voltage, is selected for the first braking signal. The first braking signal includes a first braking signal safety factor i=0.9 and is thus determined to be applied for a duration of 0.0037*0.9~0.0033 seconds.

In operation 704, the second braking signal is selected and applied during the second braking window. The full duration of the second braking windows is also ~0.0037 seconds, corresponding to the predicted free motion. Based on the equations and chart above, the remaining braking time after the first braking signal is 0.6*(1/2f). A second braking signal safety factor $\gamma_2$ of 0.5 is applied to the remaining braking time for the second braking signal, which yields a total duration of the second braking signal to be 0.3*(1/2f), or 0.0037*0.3~0.0011 seconds. The second braking signal is applied with a timing delay equal to 0.2 times the braking window length, or ~0.0074 seconds, and is thus applied at a time 0.0044 seconds after completion of the driving signal. After application of the second braking signal, the system energy is reduced below a haptic perceptibility threshold.

In an operation 705, corresponding to operation 606 as discussed above, the actuator system is permitted to dissipate any remaining energy.

Thus, there are provided systems, devices, and methods of using a control circuit to allow the production of sharp cutoff haptic effects of limited and extended durations. While various embodiments according to the present methods and apparatus have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present methods and apparatus should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment. Aspects of the above methods of rendering haptic effects may be used in any combination with other methods described herein or the methods can be used separately. All patents and publications discussed herein are incorporated by reference herein in their entirety.

The following paragraphs describe additional specific embodiments.

Embodiment 1 includes a haptically enabled device, comprising an actuator; a control circuit configured to control the actuator to produce a haptic effect by: providing a driving signal to the actuator; providing a first braking signal having a first polarity to the actuator during a first braking window determined according to the driving signal; and providing a second braking signal to the actuator during a second braking window determined according to the driving signal, wherein a second polarity of the second braking signal is opposite of the first polarity.

Embodiment 2 is the haptically enabled device of embodiment 1, wherein a duration of the second braking signal is determined according to a comparison of input energy to the system provided by the driving signal and energy removed from the system by the first braking signal.

Embodiment 3 is the haptically enabled device of embodiment 1 or 2, wherein a duration of the second braking signal is configured to reduce an effect level of the actuator below a haptic perceptibility threshold.

Embodiment 4 is the haptically enabled device of any of embodiments 1-3, wherein the driving signal is characterized at least by a driving signal frequency and wherein, after the first braking signal is applied, the effect level is reduced below the haptic perceptibility threshold in a time interval equal to less than one period of the driving signal frequency.

Embodiment 5 is the haptically enabled device of any of embodiments 1-4, wherein the control circuit is further configured to permit an amount of energy remaining in the actuator after application of the second braking signal to naturally dissipate.

Embodiment 6 is the haptically enabled device of any of embodiments 1-5, wherein the first braking signal is applied in opposition to a velocity of the actuator.

Embodiment 7 is the haptically enabled device of any of embodiments 1-6, wherein the actuator is a resonant actuator.

Embodiment 8 is the haptically enabled device of any of embodiments 1-7, wherein the first braking signal is a maximum voltage signal provided by the control circuit.

Embodiment 9 is the haptically enabled device of any of embodiments 1-8, wherein the driving signal characterized by a driving signal frequency, a number of peaks, and an amplitude, and wherein an onset timing and a duration of the first braking window and the second braking window are determined according to the driving signal frequency and number of peaks.

Embodiment 10 is the haptically enabled device of any of embodiments 1-9, wherein a duration of the first braking window corresponds to a half period of a driving signal frequency multiplied by a first braking signal safety factor.

Embodiment 11 is a method of controlling an actuator to produce a haptic effect comprising: providing a driving signal associated with an amplitude, a frequency and a number of peaks to the actuator; providing to the actuator a first braking signal having a first braking signal duration based on the frequency associated with the driving signal; providing to the actuator a second braking signal having at least one of a second braking signal duration based on the frequency associated with the driving signal and a start time based on the frequency and the number of peaks associated with the driving signal.

Embodiment 12 is the method of embodiment 11, wherein the first braking signal duration is further based on a first braking signal safety factor.

Embodiment 13 is the method of embodiments 11 or 12, wherein the first braking signal safety factor is selected such that the result of the haptic effect caused by the driving signal is reduced below a haptic perceptibility threshold in a time interval equal to less than one period of the driving signal.

Embodiment 14 is the method of any of embodiments 11 to 13, wherein the start time of the second braking signal is further based on at least one of the amplitude associated with the driving signal and a second braking signal safety factor.

Embodiment 15 is the method of any of embodiments 11 to 14, wherein the second braking signal safety factor is selected such that the result of the haptic effect caused by the driving signal is reduced below a haptic perceptibility threshold in a time interval equal to less than one period of the driving signal.

Embodiment 16 is the method of any of embodiments 11 to 15, further comprising determining the first braking signal and determining the second braking signal before providing the first driving signal to the actuator.

Embodiment 17 is the method of any of embodiments 11 to 17, wherein: the first braking signal duration is further based on a first braking signal safety factor; and the start time of the second braking signal is further based on at least one of the amplitude associated with the driving signal and a second braking signal safety factor.

Embodiment 18 is the method of any of embodiments 11 to 17, wherein the first and second braking signal safety factors are selected such that the result of the haptic effect caused by the driving signal is reduced below a haptic perceptibility threshold in a time interval equal to less than one period of the driving signal.

Embodiment 19 is the method of any of embodiments 11 to 18, further comprising determining a duration of the second braking signal according to a comparison of input energy to the system provided by the driving signal and energy removed from the system by the first braking signal.

Embodiment 20 is the method of any of embodiments 11 to 19, wherein the first braking signal is provided in opposition to a velocity of the actuator.

The invention claimed is:

1. A haptically enabled device, comprising:
    an actuator;
    a control circuit configured to control the actuator to produce a haptic effect by:
    providing a driving signal associated with an amplitude, a frequency, and a number of peaks or a number of oscillation half-cycles to the actuator;
    providing a first braking signal having a first braking signal duration based on the frequency associated with the driving signal; and
    providing to the actuator a second braking signal having at least one of a second braking signal duration based on the frequency associated with the driving signal and a start time based on the frequency and the number of peaks or the number of oscillation half-cycles associated with the driving signal.

2. The haptically enabled device of claim 1, wherein the first braking signal duration is further based on a first braking signal safety factor.

3. The haptically enabled device of claim 1, wherein the first braking signal safety factor is selected such that the result of the haptic effect caused by the driving signal is reduced below a haptic perceptibility threshold in a time interval equal to less than one period of the driving signal.

4. The haptically enabled device of claim 1, wherein the start time of the second braking signal is further based on at least one of the amplitudes associated with the driving signal and a second braking signal safety factor.

5. The haptically enabled device of claim 1, wherein the second braking signal safety factor is selected such that the result of the haptic effect caused by the driving signal is reduced below a haptic perceptibility threshold in a time interval equal to less than one period of the driving signal.

6. The haptically enabled device of claim 1, wherein the control circuit is further configured to control the actuator to produce the haptic effect by determining the first braking signal and determining the second braking signal before providing the first driving signal to the actuator.

7. The haptically enabled device of claim 1, wherein the first braking signal duration is further based on a first braking signal safety factor; and
    the start time of the second braking signal is further based on a second braking signal delay factor.

8. The haptically enabled device of claim 1, wherein the first braking signal safety factor and the second braking signal safety factor are selected such that the result of the haptic effect caused by the driving signal is reduced below a haptic perceptibility threshold in a time interval equal to less than one period of the driving signal.

9. The haptically enabled device of claim 1, further comprising determining a duration of the second braking signal according to a comparison of input energy to the actuator provided by the driving signal and energy removed from the actuator by the first braking signal.

10. The haptically enabled device of claim 1, wherein the first braking signal is provided in opposition to a velocity of the actuator.

11. A method of controlling an actuator to produce a haptic effect comprising:
    providing a driving signal associated with an amplitude, a frequency and a number of peaks or a number of oscillation half-cycles to the actuator;
    providing to the actuator a first braking signal having a first braking signal duration based on the frequency associated with the driving signal;
    providing to the actuator a second braking signal having at least one of a second braking signal duration based on the frequency associated with the driving signal and a start time based on the frequency and the number of peaks or the number of oscillation half-cycles associated with the driving signal.

12. The method of claim 11, wherein the first braking signal duration is further based on a first braking signal safety factor.

13. The method of claim 12, wherein the first braking signal safety factor is selected such that the result of the haptic effect caused by the driving signal is reduced below a haptic perceptibility threshold in a time interval equal to less than one period of the driving signal.

14. The method of claim 11, wherein the start time of the second braking signal is further based on at least one of the amplitude associated with the driving signal and a second braking signal safety factor.

15. The method of claim 14, wherein the second braking signal safety factor is selected such that the result of the haptic effect caused by the driving signal is reduced below a haptic perceptibility threshold in a time interval equal to less than one period of the driving signal.

16. The method of claim 11, further comprising determining the first braking signal and determining the second braking signal before providing the first driving signal to the actuator.

17. The method of claim 11, wherein:
    the first braking signal duration is further based on a first braking signal safety factor; and
    the start time of the second braking signal is further based on a second braking signal delay factor.

18. The method of claim 17, wherein the first braking signal safety factor and the second braking signal safety factor are selected such that the result of the haptic effect caused by the driving signal is reduced below a haptic perceptibility threshold in a time interval equal to less than one period of the driving signal.

19. The method of claim 11, further comprising determining a duration of the second braking signal according to a comparison of input energy to the actuator provided by the driving signal and energy removed from the actuator by the first braking signal.

20. The method of claim 11,
wherein the first braking signal is provided in opposition to a velocity of the actuator.

* * * * *